(12) United States Patent
Cai et al.

(10) Patent No.: US 12,742,992 B2
(45) Date of Patent: Sep. 22, 2026

(54) ELECTRONIC INK SCREEN AND DISPLAY APPARATUS

(71) Applicant: Honor Device Co., Ltd., Shenzhen (CN)

(72) Inventors: Peizhi Cai, Shenzhen (CN); Zheng Tian, Shenzhen (CN); Xin Li, Shenzhen (CN); Haiming He, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 211 days.

(21) Appl. No.: 18/569,022

(22) PCT Filed: Aug. 12, 2022

(86) PCT No.: PCT/CN2022/112207

§ 371 (c)(1),
(2) Date: Dec. 11, 2023

(87) PCT Pub. No.: WO2023/093135

PCT Pub. Date: Jun. 1, 2023

(65) Prior Publication Data

US 2024/0280876 A1 Aug. 22, 2024

(30) Foreign Application Priority Data

Nov. 24, 2021 (CN) ......................... 202111408661.4

(51) Int. Cl.
*G02F 1/167* (2019.01)
*G02F 1/1675* (2019.01)
(Continued)

(52) U.S. Cl.
CPC .......... *G02F 1/167* (2013.01); *G02F 1/16757* (2019.01); *G02F 1/1676* (2019.01);
(Continued)

(58) Field of Classification Search
CPC .... G02F 1/16762; G02F 1/167; G02F 1/1676; G02F 1/16757; G02F 2001/1678
See application file for complete search history.

(56) References Cited

U.S. PATENT DOCUMENTS 7,145,547 B2 12/2006 Johnson
7,746,543 B2 6/2010 Kim et al.
(Continued)

FOREIGN PATENT DOCUMENTS

CN 1688925 A 10/2005
CN 103353701 A 10/2013
(Continued)

*Primary Examiner* — Jia X Pan
(74) *Attorney, Agent, or Firm* — Conley Rose, P.C.

(57) ABSTRACT

An electronic ink screen and a display apparatus. The electronic ink screen includes at least the following which are stacked: a first conductive substrate, an ink display layer and a second conductive substrate. The ink display layer is located between the first conductive substrate and the second conductive substrate, and the second conductive substrate is located above the first conductive substrate. The ink display layer has a plurality of ink accommodating cavities that are mutually independent. A plurality of ink particles that have a same color are provided in the ink accommodating cavity. The ink particles are used for displaying a first color. The electronic ink screen further includes a function layer. The function layer is configured to display a second color. The function layer is located at a side that is of the ink display layer and that faces away from the second conductive substrate.

20 Claims, 11 Drawing Sheets

(51) Int. Cl.

| | |
|---|---|
| ***G02F 1/16757*** | (2019.01) |
| ***G02F 1/1676*** | (2019.01) |
| ***G02F 1/16762*** | (2019.01) |
| ***G02F 1/1685*** | (2019.01) |

(52) U.S. Cl.

CPC ........ *G02F 1/16762* (2019.01); *G02F 1/1685* (2019.01); *G02F 2001/1678* (2013.01)

(56) References Cited

U.S. PATENT DOCUMENTS

| | | | | |
|---|---|---|---|---|
| 9,846,344 | B2 | 12/2017 | Zhang | |
| 11,442,327 | B2 | 9/2022 | Chen | |
| 2006/0023296 | A1 | 2/2006 | Whitesides et al. | |
| 2009/0161200 | A1 | 6/2009 | Jang et al. | |
| 2012/0134009 | A1 | 5/2012 | Paolini, Jr. et al. | |
| 2014/0085705 | A1 | 3/2014 | Kang et al. | |
| 2016/0238917 | A1* | 8/2016 | Zhang | G02F 1/1677 |

FOREIGN PATENT DOCUMENTS

| | | | | | |
|---|---|---|---|---|---|
| CN | 103576405 | A | | 2/2014 | |
| CN | 105652552 | A | | 6/2016 | |
| CN | 106773016 | A | | 5/2017 | |
| CN | 110007541 | A | | 7/2019 | |
| CN | 110824806 | A | | 2/2020 | |
| CN | 110967889 | A | | 4/2020 | |
| CN | 113156732 | A | | 7/2021 | |
| CN | 113741112 | A | * | 12/2021 | G02F 1/1676 |
| KR | 20120106317 | A | | 9/2012 | |
| KR | 20120106321 | A | | 9/2012 | |
| KR | 101224194 | B1 | * | 1/2013 | G02F 1/1685 |

* cited by examiner 130
121
1231
1222
1233
1234
1232
1121
1122
1112
1111
160

ELECTRONIC INK SCREEN AND DISPLAY APPARATUS

CROSS-REFERENCE TO RELATED APPLICATIONS

This is a U.S. National Stage of International Application No. PCT/CN2022/112207 filed on Aug. 12, 2022, which claims priority to Chinese Patent Application No. 202111408661.4, filed with the China National Intellectual Property Administration on Nov. 24, 2021, both of which are incorporated herein by reference in their entireties.

TECHNICAL FIELD

Embodiments of this application relate to the technical field of electronic paper display technologies, and in particular, to an electronic ink screen and a display apparatus.

BACKGROUND

Currently, a common electronic ink screen includes two substrates, and an electronic ink layer including a large quantity of microcapsule structures is disposed between the two substrates. The electronic ink layer is formed by sealing many positively charged black ink particles and many negatively charged white ink particles within the microcapsule structure that is liquid inside. Because the ink particles of different colors move to different directions due to different applied electric fields, the ink particles of different colors are arranged in an orderly manner, so that the electronic ink screen presents a clear black and white visualization effect.

However, in the foregoing solution, because the black ink particles and the white ink particles carry different charges, the black ink particles and the white ink particles interfere with each other when moving, resulting in a slow refreshing speed of the electronic ink screen and a long response time of the electronic ink screen.

SUMMARY

Embodiments of this application provide an electronic ink screen and a display apparatus, which can improve a refreshing speed of the electronic ink screen, thereby reducing a response time of the electronic ink screen.

In a first aspect, an embodiment of this application provides an electronic ink screen. The electronic ink screen includes at least the following which are stacked: a first conductive substrate, an ink display layer and a second conductive substrate. The ink display layer is located between the first conductive substrate and the second conductive substrate. The second conductive substrate is located above the first conductive substrate. The ink display layer has a plurality of ink accommodating cavities that are mutually independent. A plurality of ink particles that have a same color are provided in the ink accommodating cavity. The ink particles are used for displaying a first color. The electronic ink screen further includes a function layer. The function layer is configured to display a second color. The function layer is located at a side that is of the ink display layer and that faces away from the second conductive substrate.

In the electronic ink screen according to this embodiment of this application, the function layer is disposed at the side that is of the ink display layer and that faces away from the second conductive substrate. When an electric field in a vertical direction is applied, the plurality of ink particles in each ink accommodating cavity move to an inner top wall or an inner bottom wall close to the ink accommodating cavity: In this case, a color displayed by the electronic ink screen is a color presented by the ink particles in the ink accommodating cavity (that is, the first color). When an electric field in a parallel direction is applied, the plurality of ink particles in each ink accommodating cavity move to an inner side wall close to the ink accommodating cavity. In this case, a color displayed by the electronic ink screen is a color generated by the function layer (that is, the second color). When both the electric field in the parallel direction and the electric field in the vertical direction are applied, the plurality of ink particles in each ink accommodating cavity are dispersedly provided in the ink accommodating cavity: In this case, a color displayed by the electronic ink screen is between the first color and the second color. That is, the electronic ink screen displays in a gray state. Therefore, in this embodiment of this application, it only needs to provide the plurality of ink particles with a same color in each ink accommodating cavity, and apply the electric fields in different directions, to enable the electronic ink screen to present states of different colors. This avoids a problem of motion interference generated by switches between ink particles of two different colors in the prior art, so that a refreshing speed of the electronic ink screen can be improved, thereby reducing a response time of the electronic ink screen.

In a possible implementation, the first conductive substrate includes a drive layer and an electrode layer. The drive layer provides a voltage for the electrode layer, to form the electric field in the vertical direction and an electric field in a horizontal direction.

In a possible implementation, the electrode layer includes at least one electrode group. Each ink accommodating cavity corresponds to one electrode group. The electrode group includes a first electrode and a second electrode. The first electrode and the second electrode are disposed relative to each other in a thickness direction perpendicular to the electronic ink screen. The drive layer provides a voltage for the electrode layer, to form the electric field in the vertical direction between the electrode layer and the second conductive substrate, and to form the electric field in the horizontal direction between the first electrode and the second electrode. The electric field in the vertical direction is used for controlling the ink particles to move in the vertical direction in the ink accommodating cavity. The electric field in the horizontal direction is used for controlling the ink particles to move in the horizontal direction in the ink accommodating cavity:

The drive layer provides a voltage for the electrode layer, to enable an electric potential difference to be formed between the electrode layer and the second conductive substrate, to form the electric field in the vertical direction between the electrode layer and the second conductive substrate. For example, the drive layer provides a voltage for the first electrode separately, to enable an electric potential difference to be formed between the first electrode and the second conductive substrate, to form the electric field in the vertical direction between the electrode layer and the second conductive substrate. Alternatively, the drive layer provides a voltage for the second electrode separately; to enable an electric potential difference to be formed between the second electrode and the second conductive substrate, to form the electric field in the vertical direction between the electrode layer and the second conductive substrate. Alternatively, the drive layer provides voltages for both the first electrode and the second electrode, to enable electric potential differences to be formed between the first electrode and the second conductive substrate and between the second electrode and the second conductive substrate, to form the electric field in the vertical direction between the electrode layer and the second conductive substrate.

The first electrode and the second electrode are disposed relative to each other in the thickness direction perpendicular to the electronic ink screen. That is, the first electrode and the second electrode are disposed relative to each other in the horizontal direction. When the drive layer provides a voltage for the electrode layer, for example, the drive layer provides a voltage for the first electrode separately, an electric potential difference is enabled to be formed between the first electrode and the second electrode, to form the electric field in the horizontal direction between the first electrode and the second electrode. Alternatively, the drive layer provides a voltage for the second electrode separately, to enable an electric potential difference to be formed between the first electrode and the second electrode, to form the electric field in the horizontal direction between the first electrode and the second electrode. Alternatively, the drive layer provides voltages in different magnitudes for both the first electrode and the second electrode, to enable an electric potential difference to be formed between the first electrode and the second electrode, to form the electric field in the horizontal direction between the first electrode and the second electrode.

In a possible implementation, the drive layer includes a substrate layer and at least one drive switch that is located on the substrate layer. The at least one drive switch provides a voltage for the electrode layer.

In a possible implementation, each ink accommodating cavity corresponds to a drive switch. The drive switch provides a voltage for the first electrode, or the drive switch provides a voltage for the second electrode.

In a possible implementation, each ink accommodating cavity corresponds to two drive switches. One of the two drive switches provides a voltage for the first electrode, and the other of the two drive switches provides a voltage for the second electrode.

In a possible implementation, the function layer is a black matrix layer. The ink particles are white ink particles. The black matrix layer is disposed at the side that is of the ink display layer and that faces away from the second conductive substrate. When the electric field in the parallel direction is applied, a plurality of white ink particles in each ink accommodating cavity move to the inner side wall close to the ink accommodating cavity. In this case, a color displayed by the electronic ink screen is a color of the black matrix layer. That is, the electronic ink screen is in a black state. When the electric field in the vertical direction is applied, the plurality of white ink particles in each ink accommodating cavity move to the inner top wall or the inner bottom wall close to the ink accommodating cavity: In this case, a color displayed by the electronic ink screen is a color presented by the white ink particles. That is, the electronic ink screen is in a white state. When both the electric field in the parallel direction and the electric field in the vertical direction are applied, the plurality of white ink particles in each ink accommodating cavity are dispersedly provided in the ink accommodating cavity. In this case, the electronic ink screen displays in a gray state. In other words, it only needs to provide the plurality of white ink particles in each ink accommodating cavity; and apply the electric fields in different directions, to enable the electronic ink screen present states of different colors. This avoids a problem of motion interference generated by switches between ink particles of two different colors in the prior art, so that a refreshing speed of the electronic ink screen can be improved, thereby reducing a response time of the electronic ink screen.

In a possible implementation, a material used by the black matrix layer is any one or more of chromium or black resin.

In a possible implementation, in a first drive state, the electric field in the horizontal direction is formed between the first electrode and the second electrode, the white ink particles move to the inner side wall close to the ink accommodating cavity, and the electronic ink screen displays a black color. In a second drive state, the electric field in the vertical direction is formed between the electrode layer and the second conductive substrate, the white ink particles move to the inner top wall or the inner bottom wall close to the ink accommodating cavity, and the electronic ink screen displays a white color. In a third drive state, the electric field in the horizontal direction is formed between the first electrode and the second electrode, the electric field in the vertical direction is formed between the electrode layer and the second conductive substrate, the white ink particles are dispersedly provided in the ink accommodating cavity, and the electronic ink screen displays in a gray state.

In a possible implementation, the black matrix layer is located between the ink display layer and the first conductive substrate.

In a possible implementation, the black matrix layer is located between the electrode layer and the drive layer.

In a possible implementation, the function layer is a reflective metal layer. The ink particles are black ink particles. The reflective metal layer is disposed at the side that is of the ink display layer and that faces away from the second conductive substrate. When the electric field in the parallel direction is applied, a plurality of black ink particles in each ink accommodating cavity move to the inner side wall close to the ink accommodating cavity: In this case, when shining downward, sunlight is reflected by the reflective metal layer, and a color displayed by the electronic ink screen is a white color. That is, the electronic ink screen is in a white state. When the electric field in the vertical direction is applied, the plurality of black ink particles in each ink accommodating cavity move to the inner top wall or the inner bottom wall close to the ink accommodating cavity: In this case, a color displayed by the electronic ink screen is a color presented by the black ink particles. That is, the electronic ink screen is in a black state. When both the electric field in the parallel direction and the electric field in the vertical direction are applied, the plurality of black ink particles in each ink accommodating cavity are dispersedly provided in the ink accommodating cavity: In this case, the electronic ink screen displays in a gray state. In other words, it only needs to provide the plurality of black ink particles in each ink accommodating cavity, and apply the electric fields in different directions, to enable the electronic ink screen to present states of different colors. This avoids a problem of motion interference generated by switches between ink particles of two different colors in the prior art, so that a refreshing speed of the electronic ink screen can be improved, thereby reducing a response time of the electronic ink screen.

In a possible implementation, a material used by the reflective metal layer is aluminum or silver.

In a possible implementation, in a first drive state, the electric field in the horizontal direction is formed between the first electrode and the second electrode, the black ink particles move to the inner side wall close to the ink accommodating cavity, and the electronic ink screen displays a white color. In a second drive state, the electric field in the vertical direction is formed between the electrode layer and the second conductive substrate, the black ink particles move to the inner top wall or the inner bottom wall close to the ink accommodating cavity, and the electronic ink screen displays a black color. In a third drive state, the electric field in the horizontal direction is formed between the first electrode and the second electrode, the electric field in the vertical direction is formed between the electrode layer and the second conductive substrate, the black ink particles are dispersedly provided in the ink accommodating cavity, and the electronic ink screen displays in a gray state.

In a possible implementation, the reflective metal layer is located between the electrode layer and the drive layer.

In a possible implementation, the function layer is a display screen.

In some possible implementations, the display screen is an organic light-emitting diode display screen or a liquid crystal display:

In a possible implementation, the ink particles are white ink particles. The display screen is in a black state. The organic light-emitting diode display screen or the liquid crystal display in a black state is disposed at the side that is of the ink display layer and that faces away from the second conductive substrate. When the electric field in the parallel direction is applied, a plurality of white ink particles in each ink accommodating cavity move to the inner side wall close to the ink accommodating cavity. In this case, a color displayed by the electronic ink screen is a color displayed by the organic light-emitting diode display screen or the liquid crystal display. That is, the electronic ink screen is in a black state. When the electric field in the vertical direction is applied, the plurality of white ink particles in each ink accommodating cavity move to the inner top wall or the inner bottom wall close to the ink accommodating cavity: In this case, a color displayed by the electronic ink screen is a color presented by the white ink particles. That is, the electronic ink screen is in a white state. When both the electric field in the parallel direction and the electric field in the vertical direction are applied, the plurality of white ink particles in each ink accommodating cavity are dispersedly provided in the ink accommodating cavity. In this case, the electronic ink screen displays in a gray state. In other words, it only needs to provide the plurality of white ink particles in each ink accommodating cavity, and apply the electric fields in different directions, to enable the electronic ink screen present states of different colors. This avoids a problem of motion interference generated by switches between ink particles of two different colors in the prior art, so that a refreshing speed of the electronic ink screen can be improved, thereby reducing a response time of the electronic ink screen.

In a possible implementation, in a first drive state, the electric field in the horizontal direction is formed between the first electrode and the second electrode, the white ink particles move to the inner side wall close to the ink accommodating cavity; and the electronic ink screen displays a black color. In a second drive state, the electric field in the vertical direction is formed between the electrode layer and the second conductive substrate, the white ink particles move to the inner top wall or the inner bottom wall close to the ink accommodating cavity, and the electronic ink screen displays a white color. In a third drive state, the electric field in the horizontal direction is formed between the first electrode and the second electrode, the electric field in the vertical direction is formed between the electrode layer and the second conductive substrate, the white ink particles are dispersedly provided in the ink accommodating cavity, and the electronic ink screen displays in a gray state.

In a possible implementation, the ink particles are black ink particles. The display screen is in a display state. The organic light-emitting diode display screen or the liquid crystal display in a display state is disposed at the side that is of the ink display layer and that faces away from the second conductive substrate. When the electric field in the parallel direction is applied, a plurality of black ink particles in each ink accommodating cavity move to the inner side wall close to the ink accommodating cavity. In this case, a color displayed by the electronic ink screen is a color displayed by the organic light-emitting diode display screen or the liquid crystal display: That is, the electronic ink screen is in a display state (for example, a white state). When the electric field in the vertical direction is applied, the plurality of black ink particles in each ink accommodating cavity move to the inner top wall or the inner bottom wall close to the ink accommodating cavity. In this case, a color displayed by the electronic ink screen is a color presented by the black ink particles. That is, the electronic ink screen is in a black state. When both the electric field in the parallel direction and the electric field in the vertical direction are applied, the plurality of black ink particles in each ink accommodating cavity are dispersedly provided in the ink accommodating cavity. In this case, the electronic ink screen displays in a gray state. In other words, it only needs to provide the plurality of black ink particles in each ink accommodating cavity, and apply the electric fields in different directions, to enable the electronic ink screen to present states of different colors. This avoids a problem of motion interference generated by switches between ink particles of two different colors in the prior art, so that a refreshing speed of the electronic ink screen can be improved, thereby reducing a response time of the electronic ink screen.

In a possible implementation, in a first drive state, the electric field in the horizontal direction is formed between the first electrode and the second electrode, the black ink particles move to the inner side wall close to the ink accommodating cavity, and the electronic ink screen displays a white color. In a second drive state, the electric field in the vertical direction is formed between the electrode layer and the second conductive substrate, the black ink particles move to the inner top wall or the inner bottom wall close to the ink accommodating cavity, and the electronic ink screen displays a black color. In a third drive state, the electric field in the horizontal direction is formed between the first electrode and the second electrode, the electric field in the vertical direction is formed between the electrode layer and the second conductive substrate, the black ink particles are dispersedly provided in the ink accommodating cavity, and the electronic ink screen displays in a gray state.

In a possible implementation, the display screen is located at a side that is of the first conductive substrate and that faces away from the ink display layer.

In a possible implementation, the ink display layer includes a plurality of microcapsule structures, and internal space of each microcapsule structure forms the ink accommodating cavity.

In a possible implementation, the ink display layer includes a plurality of microcup structures, and internal space of each microcup structure forms the ink accommodating cavity.

In a possible implementation, electrophoretic base liquid is further provided in the ink accommodating cavity, and the ink particles move in the electrophoretic base liquid.

In a possible implementation, materials of the second conductive substrate and the electrode layer are indium tin oxide.

In a possible implementation, the drive switch is a thin film transistor.

According to a second aspect, an embodiment of this application provides a display apparatus, including at least any one of the foregoing electronic ink screens.

The display apparatus according to embodiments of this application. The display apparatus includes an ink display screen. In the electronic ink screen, a function layer is disposed at a side that is of a ink display layer and that faces away from a second conductive substrate. When an electric field in a vertical direction is applied, a plurality of ink particles in each ink accommodating cavity move to an inner top wall or an inner bottom wall close to the ink accommodating cavity. In this case, a color displayed by the electronic ink screen is a color presented by the ink particles in the ink accommodating cavity (that is, a first color). When an electric field in a parallel direction is applied, the plurality of ink particles in each ink accommodating cavity move to an inner side wall close to the ink accommodating cavity. In this case, a color displayed by the electronic ink screen is a color generated by the function layer (that is, a second color). When both the electric field in the parallel direction and the electric field in the vertical direction are applied, the plurality of ink particles in each ink accommodating cavity are dispersedly provided in the ink accommodating cavity. In this case, a color displayed by the electronic ink screen is between the first color and the second color. That is, the electronic ink screen displays in a gray state. Therefore, in this embodiment of this application, it only needs to provide the plurality of ink particles with a same color in each ink accommodating cavity, and apply the electric fields in different directions, to enable the electronic ink screen to present states of different colors. This avoids a problem of motion interference generated by switches between ink particles of two different colors in the prior art, so that a refreshing speed of the electronic ink screen can be improved, thereby reducing a response time of the electronic ink screen.

Figure 1:
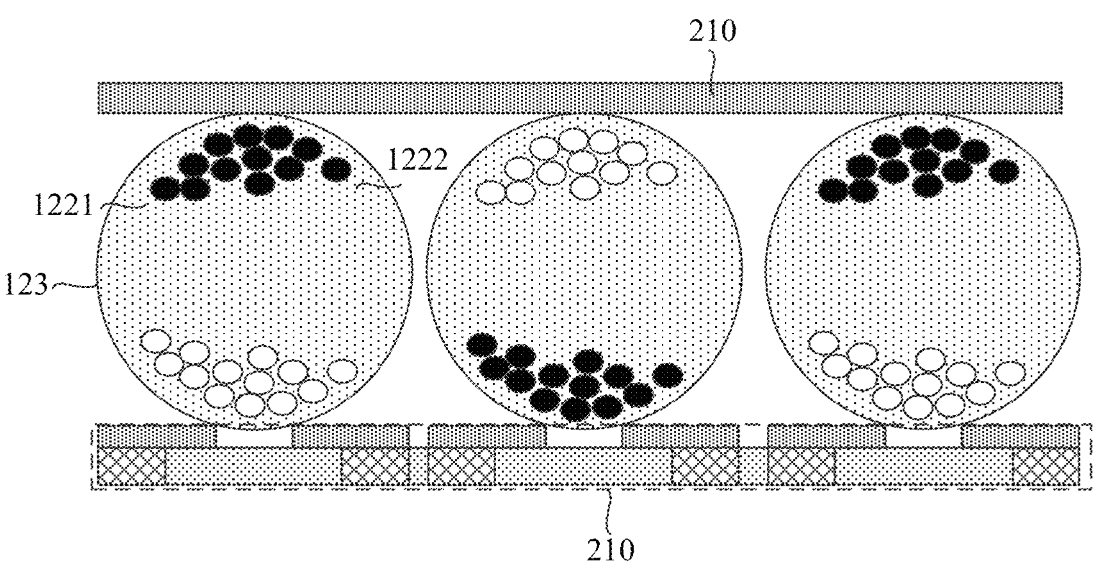
FIG. 1 is a schematic diagram of a structure of an electronic ink screen in the prior art.

| Descriptions of reference numerals: |
| --- |
| 100-electronic ink screen; |
| 110-first conductive substrate; |
| 111-drive layer; |
| 1111-substrate layer; |

-continued

| Descriptions of reference numerals: |
|---|
| 1112-drive switch; |
| 112-electrode group; |
| 1121-first electrode; |
| 1122-second electrode; |
| 121-ink accommodating cavity; |
| 1211-electrophoretic base liquid; |
| 1221-white ink particle; |
| 1222-black ink particle; |
| 123-microcapsule structure; |
| 1231-inner top wall; |
| 1232-inner bottom wall; |
| 1233-inner left side wall; |
| 1234-inner right side wall; |
| 124-microcup structure; |
| 130-second conductive substrate; |
| 140-black matrix layer; |
| 141-first through hole; |
| 150-reflective metal layer; |
| 151-second through hole; |
| 160-display screen; |
| D1-first gray state; |
| D2-second gray state; |
| D3-third gray state; |
| 210-substrate. |

DESCRIPTION OF EMBODIMENTS

Terms used in implementations of this application are merely used for explaining detailed embodiments of this application, and are not intended to limit this application. Implementations of embodiments of this application are described in detail below with reference to the accompanying drawings.

Currently, researches about electronic ink screen technologies mainly include an electrophoretic display technology, a cholesterol liquid crystal technology, an electrowetting technology, a rolling ball technology, an electrochromic technology, a micro-electro-mechanical technology, and the like. The electrophoretic display technology has advantages such as a wide viewing angle, high contrast, high reflectivity, and becomes the most mature electronic ink screen technology at present. In addition, a black and white electrophoretic display technology has been applied in mass production.

An existing electronic ink screen is a bistable display screen. When a picture is displayed static, a drive circuit does not consume power. When the picture is refreshed, the drive circuit consumes a particular amount of power. As shown in FIG. 1, in conventional technologies, a common electronic ink screen includes two substrates 210, and electronic ink including a large quantity of microcapsule structures 123 is provided between the two substrates 210. The electronic ink is formed by sealing many positively charged black ink particles 1222 and many negatively charged white ink particles 1221 within the microcapsule structure 123 that is liquid inside. Because the ink particles of different colors move to different directions due to different applied electric fields, the ink particles of different colors are arranged in an orderly manner, so that a clear black and white visualization effect is presented.

However, two types of the white ink particles and the black ink particles exists in a same microcapsule structure 123. Because the black ink particles 1222 and the white ink particles 1221 carry different charges, when moving in the microcapsule structure 123 that is liquid inside, the black ink particles and the white ink particles interfere with each other, resulting in a slow refreshing speed of the electronic ink screen and a long response time of the electronic ink screen.

Figure 2:
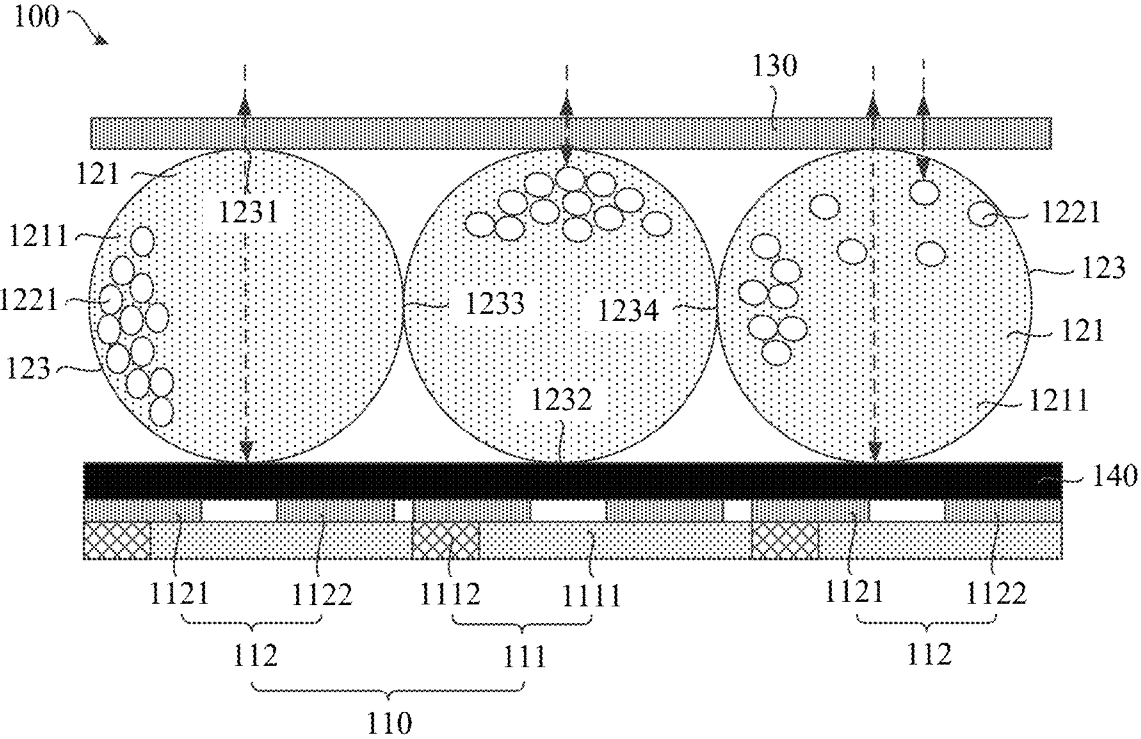
FIG. 2 is a schematic diagram of a structure of an electronic ink screen according to an embodiment of this application.
Figure 3:
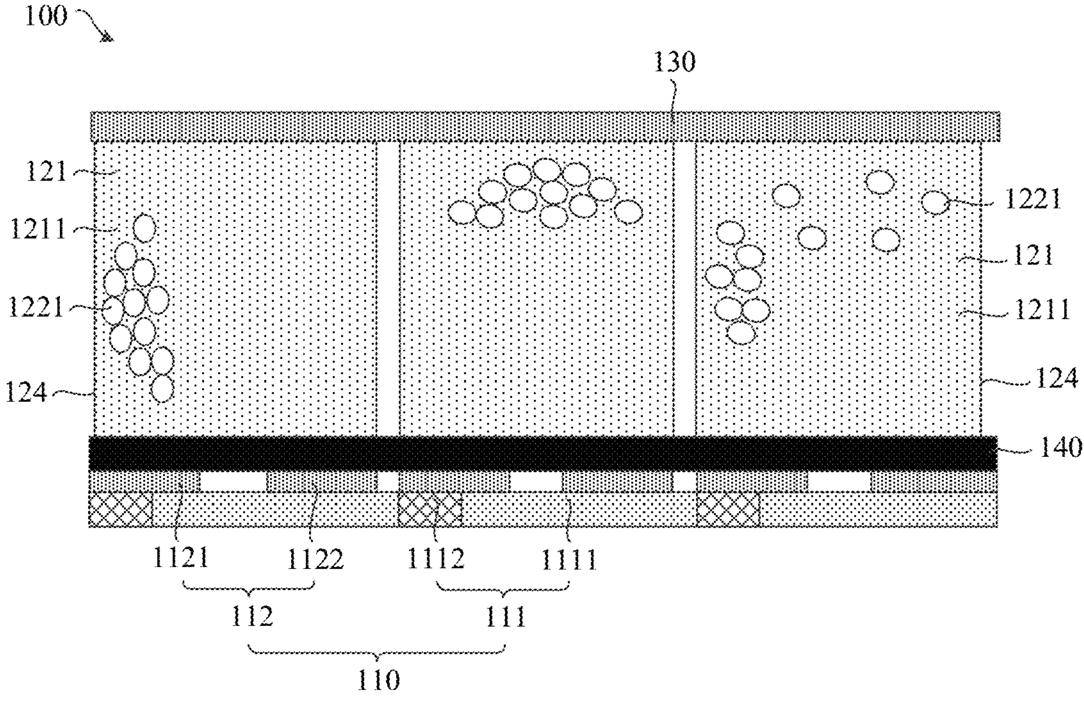
FIG. 3 is a schematic diagram of a structure of an electronic ink screen according to an embodiment of this application.

Based on this, as shown in FIG. 2 and FIG. 3, embodiments of this application provide a new electronic ink screen 100 to resolve the foregoing technical problem. The electronic ink screen 100 according to embodiments of this application may be applicable to a solution of a microcapsule structure 123 (refer to FIG. 2), and may alternatively be applicable to a solution of a microcup structure 124 (refer to FIG. 3). This is not limited in embodiments of this application.

It should be noted that when the electronic ink screen 100 is applicable to the solution of the microcapsule structure 123, refer to FIG. 2, an ink display layer may include a plurality of microcapsule structures 123. Internal space of each microcapsule structure 123 forms an ink accommodating cavity 121, and a plurality of white ink particles 1221 are provided in each ink accommodating cavity 121. When the electronic ink screen 100 is applicable to the solution of the microcup structure 124, refer to FIG. 3, an ink display layer may include a plurality of microcup structures 124. Internal space of each microcup structure 124 forms an ink accommodating cavity 121, and a plurality of white ink particles 1221 are provided in each ink accommodating cavity 121.

For simplifying description and ease of understanding, all of subsequent embodiments of this application are described by using a case that the electronic ink screen 100 uses the microcapsule structure 123. Certainly, embodiments of this application are not limited to be applied to the solution of the microcapsule structure 123, and may also be applied to the solution of the microcup structure 124 or a solution of any other structures.

A specific structure of the electronic ink screen 100 is described in detail below by using different embodiments as examples with reference to the accompany drawings.

Embodiment 1

Refer to FIG. 2. An embodiment of this application provides an electronic ink screen 100. The electronic ink screen 100 may include at least the following which are stacked: a first conductive substrate 110, an ink display layer and a second conductive substrate 130. The ink display layer is located between the first conductive substrate 110 and the second conductive substrate 130, and the second conductive substrate 130 is located above the first conductive substrate 110.

A material of the second conductive substrate 130 may be indium tin oxide (Indium tin oxide, ITO). The indium tin oxide has good conductivity and transparency.

Still refer to FIG. 2. The ink display layer may have a plurality of ink accommodating cavities 121 that are mutually independent. A plurality of ink particles that have a same color are provided in the ink accommodating cavity 121. The ink particles are used for displaying a first color. Specifically, a plurality of black ink particles 1222 may be provided in each ink accommodating cavity 121. Alternatively, a plurality of white ink particles 1221 may be provided in each ink accommodating cavity 121 (refer to FIG. 2).

It may be understood that electrophoretic base liquid 1211 may also be provided in the ink accommodating cavity 121. The electrophoretic base liquid 1211 is in a transparent state. The ink particles (for example, the white ink particles in FIG. 2) move freely in the electrophoretic base liquid 1211.

In this embodiment of this application, the electronic ink screen 100 may further include a function layer. The function layer is configured to display a second color. In addition, the function layer may be located at a side that is of the ink display layer and that faces away from the second conductive substrate 130.

In this way; when an electric field in a vertical direction is applied, the plurality of ink particles in the ink accommodating cavity 121 move to an inner top wall 1231 or an inner bottom wall 1232 close to the ink accommodating cavity 121. In this case, a color displayed by the electronic ink screen 100 is a color presented by the ink particles in the ink accommodating cavity 121 (that is, the first color). When an electric field in a parallel direction is applied, the plurality of ink particles in each ink accommodating cavity 121 move to an inner side wall close to the ink accommodating cavity 121. In this case, a color displayed by the electronic ink screen 100 is a color generated by the function layer (that is, a second color). When both the electric field in the parallel direction and the electric field in the vertical direction are applied, the plurality of ink particles in each ink accommodating cavity 121 are dispersedly provided in the ink accommodating cavity 121. In this case, a color displayed by the electronic ink screen 100 is between the first color and the second color. That is, the electronic ink screen 100 displays in a gray state.

Therefore, in this embodiment of this application, it only needs to provide the plurality of ink particles with a same color in each ink accommodating cavity 121, and apply the electric fields in different directions, to enable the electronic ink screen 100 to present states of different colors. This avoids a problem of motion interference generated by switches between ink particles of two different colors in the prior art, so that a refreshing speed of the electronic ink screen 100 can be improved, thereby reducing a response time of the electronic ink screen 100.

As shown in FIG. 2, in this embodiment of this application, the function layer may be a black matrix layer 140. The ink particles may be white ink particles 1221.

Figure 4A:
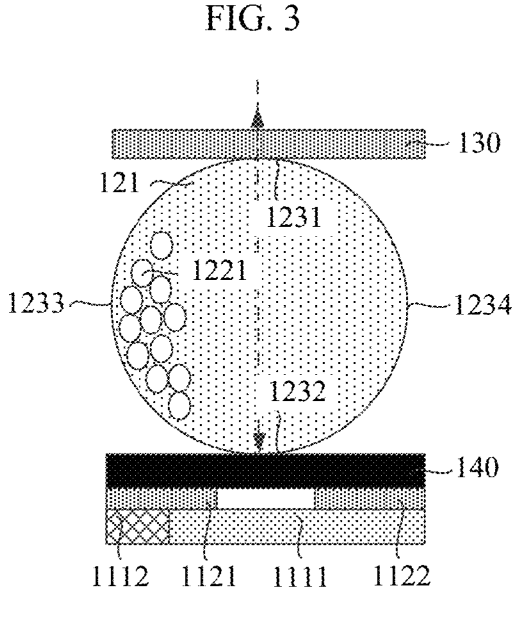
FIG. 4A is a schematic diagram of a structure when white ink particles in the electronic ink screen shown in FIG. 2 move to an inner side wall close to an ink accommodating cavity.

In this way; when the electric field in the parallel direction is applied, the plurality of white ink particles 1221 in each ink accommodating cavity 121 move to the inner side wall (for example, an inner front side wall, an inner back side wall, an inner left side wall 1233, or inner right side wall 1234) close to the ink accommodating cavity 121. For example, in FIG. 4A, the plurality of white ink particles 1221 in the ink accommodating cavity 121 move to the inner left side wall 1233 close to the ink accommodating cavity 121. In this case, sunlight passes through the microcapsule structure 123, shines downward, and is absorbed by the black matrix layer 140. A color displayed by the electronic ink screen 100 is a color of the black matrix layer 140. That is, the electronic ink screen 100 in is a black state.

Figure 4B:
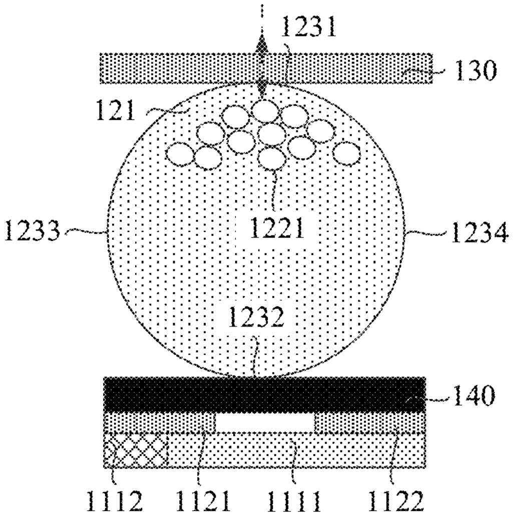
FIG. 4B is a schematic diagram of a structure when white ink particles in the electronic ink screen shown in FIG. 2 move to an inner top wall close to an ink accommodating cavity.

When the electric field in the vertical direction is applied, the plurality of white ink particles 1221 in each ink accommodating cavity 121 move to the inner top wall 1231 or the inner bottom wall 1232 close to the ink accommodating cavity 121. For example, in FIG. 4B, the plurality of white ink particles 1221 in the ink accommodating cavity 121 move to the inner top wall 1231 close to the ink accommodating cavity 121. In this case, the sunlight passes through the microcapsule structure 123, shines downward, and is reflected by the white ink particles 1221. A color displayed by the electronic ink screen 100 is a color presented by the white ink particles 1221. That is, the electronic ink screen 100 in is a white state.

Figure 4C:
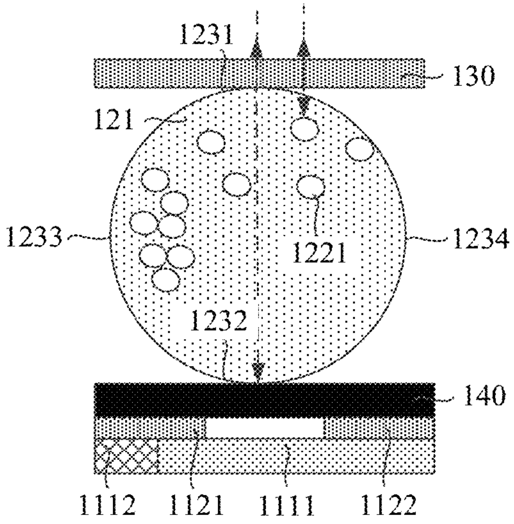
FIG. 4C is a schematic diagram of a structure when white ink particles in the electronic ink screen shown in FIG. 2 are dispersedly provided in an ink accommodating cavity.

When both the electric field in the parallel direction and the electric field in the vertical direction are applied, the plurality of white ink particles 1221 in each ink accommodating cavity 121 are dispersedly provided in the ink accommodating cavity 121 (refer to FIG. 4C). In this case, the electronic ink screen 100 displays in a gray state.

In other words, in this embodiment of this application, it only needs to provide the plurality of white ink particles 1221 in each ink accommodating cavity 121, and apply the electric fields in different directions, to enable the electronic ink screen 100 to present states of different colors. This avoids a problem in the prior art that because the black particles and the white particles carry different charges, the black particles and the white particles may generate motion interference when moving. Therefore, this embodiment of this application can improve a refreshing speed of the electronic ink screen 100, thereby reducing a response time of the electronic ink screen 100.

In addition, in the prior art, when a displayed picture is needed to be switched, such as switched from a black color to a white color, because some black particles have no time to move and remain in the picture, these black particles are mixed with the white particles, which leads to an occurrence of a ghost image and affects contrast of the picture. In this embodiment of this application, it only needs to provide the plurality of white ink particles 1221 in each ink accommodating cavity 121. This avoids a problem of mutual switching of two ink particles of different colors, so that occurrence of a ghost image can be avoided, thereby facilitating to improve image contrast of the electronic ink screen 100 and optimizing user experience.

It should be noted that a black matrix is a light-absorbing material, and a material used by the black matrix (Black Matrix, BM) layer may be any one or more of chromium (Cr, Crox) or black resin (Black Resin).

In addition, as shown in FIG. 2, in this embodiment of this application, the first conductive substrate 110 may include a drive layer 111 and an electrode layer. The drive layer 111 provides a voltage for the electrode layer, to form an electric field in the vertical direction and an electric field in the horizontal direction. A material of the electrode layer may be indium tin oxide. The indium tin oxide is used as a transparent electrode material, and light transmittance of the indium tin oxide may be at least 90%.

Specifically, the electrode layer may include at least one electrode group 112, and each ink accommodating cavity 121 corresponds to one electrode group 112. For example, three ink accommodating cavities 121 in FIG. 2 respectively correspond to an electrode group 112. Each electrode group 112 may include a first electrode 1121 and a second electrode 1122. The first electrode 1121 and the second electrode 1122 are disposed relative to each other in a thickness direction perpendicular to the electronic ink screen 100. The drive layer 111 provides a voltage for the electrode group 112, so that an electric field in the vertical direction is formed between the electrode group 112 and the second conductive substrate 130, and an electric field in the horizontal direction is formed between the first electrode 1121 and the second electrode 1122. The electric field in the vertical direction is used for controlling the white ink particles 1221 to move in the vertical direction in the ink accommodating cavity 121. The electric field in the horizontal direction is used for controlling the white ink particles 1221 to move in the horizontal direction in the ink accommodating cavity 121.

It may be understood that the drive layer 111 provides a voltage for the electrode group 112, to enable an electric potential difference to be formed between the electrode group 112 and the second conductive substrate 130, to form the electric field in the vertical direction between the electrode group 112 and the second conductive substrate 130.

For example, the drive layer 111 provides a voltage for the first electrode 1121 separately; to enable an electric potential difference to be formed between the first electrode 1121 and the second conductive substrate 130, to form the electric field in the vertical direction between the electrode group 112 and the second conductive substrate 130. Alternatively, the drive layer 111 provides a voltage for the second electrode 1122 separately, to enable an electric potential difference to be formed between the second electrode 1122 and the second conductive substrate 130, to form the electric field in the vertical direction between the electrode group 112 and the second conductive substrate 130. Alternatively, the drive layer 111 provides voltages for both the first electrode 1121 and the second electrode 1122, to enable electric potential differences to be formed between the first electrode 1121 and the second conductive substrate 130 and between the second electrode 1122 and the second conductive substrate 130, to form the electric field in the vertical direction between the electrode group 112 and the second conductive substrate 130.

In addition, it should be noted that, an example in which the drive layer 111 provides voltages for both the first electrode 1121 and the second electrode 1122, so that the white ink particles 1221 move to the inner top wall 1231 or the inner bottom wall 1232 close to the ink accommodating cavity 121 is used, and when all of the white ink particles 1221 need to be located at the inner top wall 1231 or the inner bottom wall 1232 close to the ink accommodating cavity 1021, that is, the electronic ink screen 100 is in a black state, the voltages applied to the first electrode 1121 and the second electrode 1122 may be same. When there is no need for all of the white ink particles 1221 to be located at the inner top wall 1231 or the inner bottom wall 1232 close to the ink accommodating cavity 1021, for example, some white ink particles 1221 may be located at a middle portion, an upper middle portion, or a lower middle portion of the ink accommodating cavity 1021, the voltages applied to the first electrode 1121 and the second electrode 1122 may be different.

In this embodiment of this application, the first electrode 1121 and the second electrode 1122 are disposed relative to each other in the thickness direction perpendicular to the electronic ink screen 100. That is, the first electrode 1121 and the second electrode 1122 are disposed relative to each other in the horizontal direction.

In this way, when the drive layer 111 provides a voltage for the electrode group 112, for example, the drive layer 111 provides a voltage for the first electrode 1121 separately, an electric potential difference is enabled to be formed between the first electrode 1121 and the second electrode 1122, to form the electric field in the horizontal direction between the first electrode 1121 and the second electrode 1122. Alternatively, the drive layer 111 provides a voltage for the second electrode 1122 separately, to enable an electric potential difference to be formed between the first electrode 1121 and the second electrode 1122, to form the electric field in the horizontal direction between the first electrode 1121 and the second electrode 1122. Alternatively, the drive layer 111 provides voltages in different magnitudes for both the first electrode 1121 and the second electrode 1122, to enable an electric potential difference to be formed between the first electrode 1121 and the second electrode 1122, to form the electric field in the horizontal direction between the first electrode 1121 and the second electrode 1122.

It should be noted that generally, when the drive layer 111 provides a voltage for the first electrode 1121 separately; an electric potential difference is enabled to be formed between the first electrode 1121 and the second conductive substrate 130, to form the electric field in the vertical direction between the electrode group 112 and the second conductive substrate 130, and an electric potential difference is alternatively enabled to be formed between the first electrode 1121 and the second electrode 1122, to form the electric field in the horizontal direction between the first electrode 1121 and the second electrode 1122. In this case, a voltage value may be flexibly adjusted based on an actual distance between the first electrode 1121 and the second conductive substrate 130 and an actual distance between the first electrode 1121 and the second electrode 1122, to enable the electric field in the vertical direction to be formed only between the electrode group 112 and the second conductive substrate 130, or to enable the electric field in the horizontal direction to be formed only between the first electrode 1121 and the second electrode 1122.

For example, as shown in FIG. 2, a distance between the first electrode 1121 and the second conductive substrate 130 is large, and a distance between the first electrode 1121 and the second electrode 1122 is small. In this case, when a small voltage is provided for the first electrode 1121, the electric field in the horizontal direction is formed between the first electrode 1121 and the second electrode 1122. When a large voltage is provided for the first electrode 1121, the electric field in the vertical direction is formed between the electrode group 112 and the second conductive substrate 130.

In addition, in this embodiment of this application, positive polarity and negative polarity of the voltage provided by the drive layer 111 for the electrode group 112 may affect an actual state of motion of the white ink particles 1221.

It may be understood that the white ink particles 1221 carry negative charges. An example in which the electric field in the vertical direction is formed between the electrode group 112 and the second conductive substrate 130 is used. When the voltage provided by the drive layer 111 for the electrode group 112 is a positive voltage, an electric potential value of the electrode group 112 is larger than an electric potential value of the second conductive substrate 130. In this way, an electric potential difference is formed between the electrode group 112 and the second conductive substrate 130, and the electric field in the vertical direction is formed between the electrode group 112 and the second conductive substrate 130. The electric field is generated starting from the electrode group 112 and extending in a direction toward the second conductive substrate 130 (that is, from bottom to top). Because the white ink particles 1221 carry the negative charges, the white ink particles 1221 move to the inner bottom wall 1232 close to the ink accommodating cavity 121. In this case, the electronic ink screen 100 is in a white state.

When the voltage provided by the drive layer 111 for the electrode group 112 is a negative voltage, an electric potential value of the electrode group 112 is smaller than an electric potential value of the second conductive substrate 130. In this way, an electric potential difference is formed between the electrode group 112 and the second conductive substrate 130, and the electric field in the vertical direction is formed between the electrode group 112 and the second conductive substrate 130. The electric field is generated starting from the second conductive substrate 130 and extending in a direction toward the electrode group 112 (that is, from top to bottom). Because the white ink particles 1221 carry the negative charges, the white ink particles 1221 move to the inner top wall 1231 close to the ink accommodating cavity 121. in this case, the electronic ink screen 100 is also in a white state.

In addition, an example in which the electric field in the horizontal direction is formed between the first electrode 1121 and the second electrode 1122 is used. When the voltage provided by the drive layer 111 for the first electrode 1121 is a positive voltage, an electric potential value of the first electrode 1121 is larger than an electric potential value of the second electrode 1122. In this way, an electric potential difference is formed between the first electrode 1121 and the second electrode 1122, and the electric field in the horizontal direction is formed between the first electrode 1121 and the second electrode 1122. The electric field is generated starting from the first electrode 1121 and extending in a direction toward the second electrode 1122 (that is, from left to right). Because the white ink particles 1221 carry the negative charges, the white ink particles 1221 move to a left side wall close to the ink accommodating cavity 121. In this case, the electronic ink screen 100 is in a black state.

When the voltage provided by the drive layer 111 for the first electrode 1121 is a negative voltage, an electric potential value of the first electrode 1121 is smaller than an electric potential value of the second electrode 1122. In this way, an electric potential difference is formed between the first electrode 1121 and the second electrode 1122, and the electric field in the horizontal direction is formed between the first electrode 1121 and the second electrode 1122. The electric field is generated starting from the second electrode 1122 and extending in a direction toward the first electrode 1121 (that is, from right to left). Because the white ink particles 1221 carry the negative charges, the white ink particles 1221 move to a right side wall close to the ink accommodating cavity 121. In this case, the electronic ink screen 100 is also in a black state.

Still refer to FIG. 2. The drive layer 111 may include a substrate layer 1111 and at least one drive switch 1112. The at least one drive switch 1112 is located above the substrate layer 1111, and the at least one drive switch 1112 is configured to provide a voltage for the electrode group 112.

In some embodiments, the drive switch 1112 may be a thin film transistor (Thin Film Transistor, TFT). The thin film transistor means that each liquid crystal pixel point on a liquid crystal display is driven by the thin film transistor integrated behind the liquid crystal pixel point. In this way, screen information can be displayed in high speed, high brightness, and high contrast.

In addition, it should be noted that, in this embodiment of this application, specific implementations when the at least one drive switch 1112 provides a voltage for the electrode group 112 include the following two possible implementations.

In one possible implementation: Refer to FIG. 2. A quantity of the drive switches 1112 corresponding to each microcapsule structure 123 is one. The drive switch 1112 provides a voltage for the first electrode 1121. Alternatively, the drive switch 1112 provides a voltage for the second electrode 1122. The drive switch 1112 provides a voltage for the first electrode 1121 separately; to enable an electric potential difference to be formed between the first electrode 1121 and the second electrode 1122, to form the electric field in the horizontal direction between the first electrode 1121 and the second electrode 1122. Alternatively, the drive switch 1112 provides a voltage for the second electrode 1122 separately; to enable an electric potential difference to be also formed between the first electrode 1121 and the second electrode 1122, to form the electric field in the horizontal direction between the first electrode 1121 and the second electrode 1122.

Figure 5:
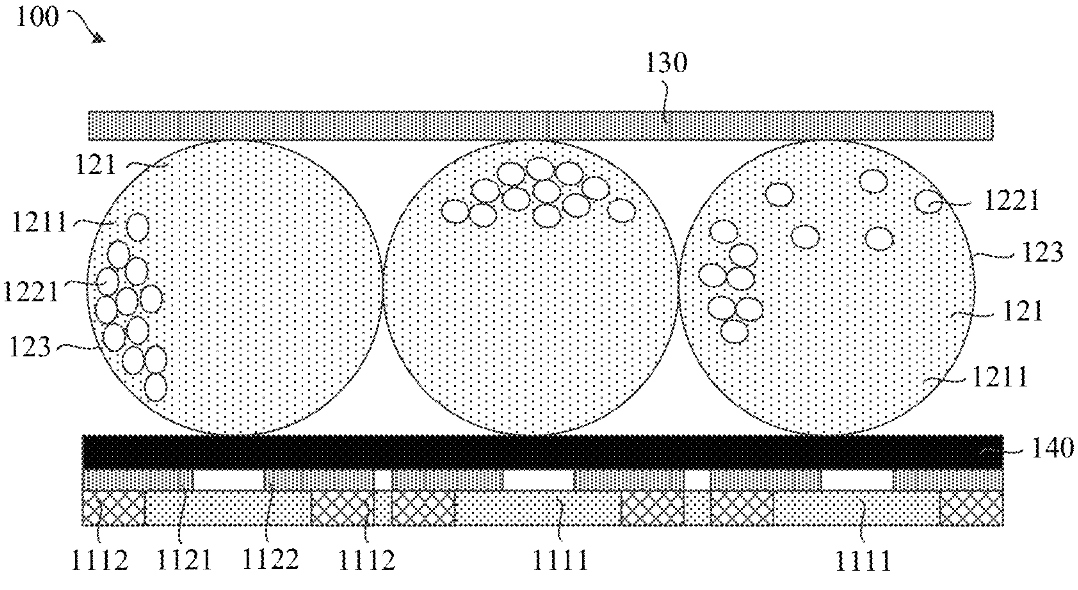
FIG. 5 is a schematic diagram of a structure of an electronic ink screen according to an embodiment of this application.

In the other possible implementation: Refer to FIG. 5. A quantity of the drive switch 1112 corresponding to each microcapsule structure 123 is two. One of the two drive switches 1112 provides a voltage for the first electrode 1121, and the other of the two drive switches 1112 provides a voltage for the second electrode 1122. In this way, when one drive switch 1112 is opened, the opened drive switch 1112 may provide a voltage for the first electrode 1121 separately, to enable an electric potential difference to be formed between the first electrode 1121 and the second electrode 1122, to form the electric field in the horizontal direction between the first electrode 1121 and the second electrode 1122. Alternatively, the opening drive switch 1112 may provide a voltage for the second electrode 1122 separately, to enable an electric potential difference to be formed between the first electrode 1121 and the second electrode 1122, to form the electric field in the horizontal direction between the first electrode 1121 and the second electrode 1122.

When both the two drive switches 1112 are opened, the two drive switches 1112 may provide voltages in different magnitudes for the first electrode 1121 and the second electrode 1122 respectively, to enable the electric potential difference to be formed between the first electrode 1121 and the second electrode 1122, to form the electric field in the horizontal direction between the first electrode 1121 and the second electrode 1122.

It may be understood that, in this embodiment of this application, in a first drive state, that is, the drive layer 111 provides a voltage for the electrode group 112 (at least one of the first electrode 1121 and the second electrode 1122), the electric field in the horizontal direction may be formed between the first electrode 1121 and the second electrode 1122. In this case, the white ink particles 1221 move to the inner side wall close to the ink accommodating cavity 121, and the electronic ink screen 100 displays a black color. In a second drive state, that is, the drive layer 111 provides a voltage for the electrode group 112 (at least one of the first electrode 1121 and the second electrode 1122), the electric field in the vertical direction is formed between the electrode group 112 and the second conductive substrate 130, and the white ink particles 1221 move to the inner top wall 1231 or the inner bottom wall 1232 close to the ink accommodating cavity 121. In this case, the electronic ink screen 100 displays a white color. In a third drive state, that is, the drive layer 111 provides a voltage for the electrode group 112 (at least one of the first electrode 1121 and the second electrode 1122), the electric field in the horizontal direction is formed between the first electrode 1121 and the second electrode 1122, the electric field in the vertical direction is formed between the electrode group 112 and the second conductive substrate 130, the white ink particles 1221 are dispersedly provided in the ink accommodating cavity 121, and the electronic ink screen 100 displays in a gray state.

Figure 6:
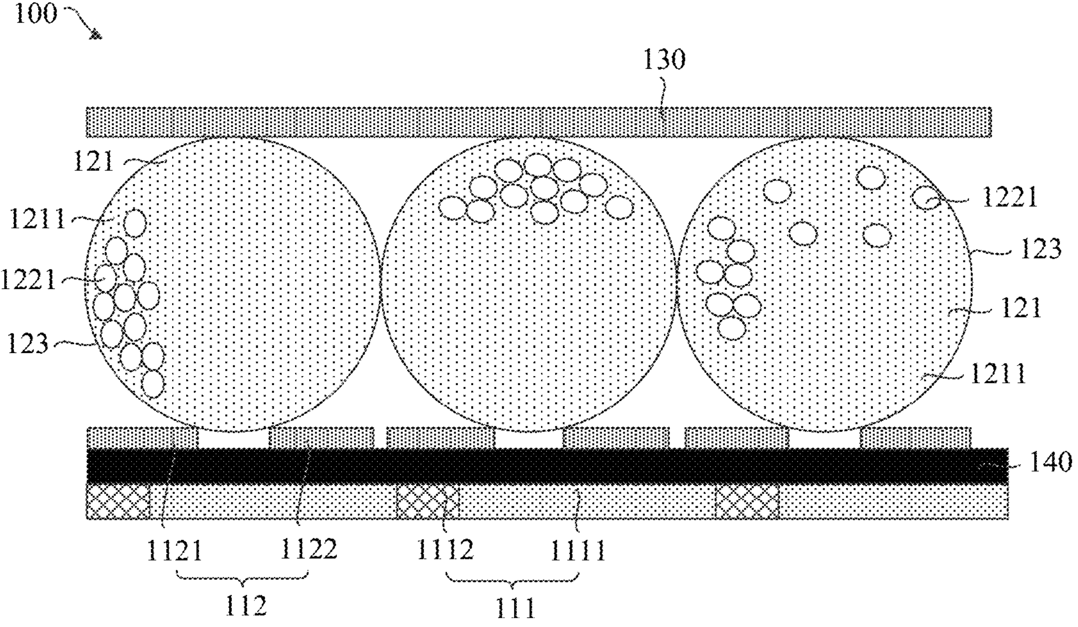
FIG. 6 is a schematic diagram of a structure of an electronic ink screen according to an embodiment of this application.
Figure 7:
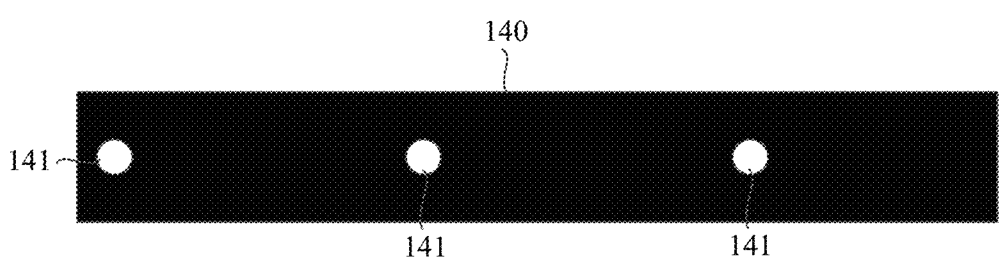
FIG. 7 is a top view of a black matrix layer of an electronic ink screen according to an embodiment of this application.

In this embodiment of this application, the black matrix layer 140 may be located between the ink display layer and the first conductive substrate 110 (refer to FIG. 2). Alternatively, as shown in FIG. 6, the black matrix layer 140 may be located between the electrode layer and the drive layer 111. The electrode group 112 is connected to the drive layer 111 by an electrode lead (not shown), and the drive layer 111 provides a voltage for the electrode group 112 through the electrode lead. In this case, generally, first through holes 141 (refer to FIG. 7) are needed to be provided on the black matrix layer 140, so that the electrode lead passes through the first through holes 141 on the black matrix layer 140 to implement providing, by the drive layer 111, a voltage for the electrode group 112.

Figure 8:
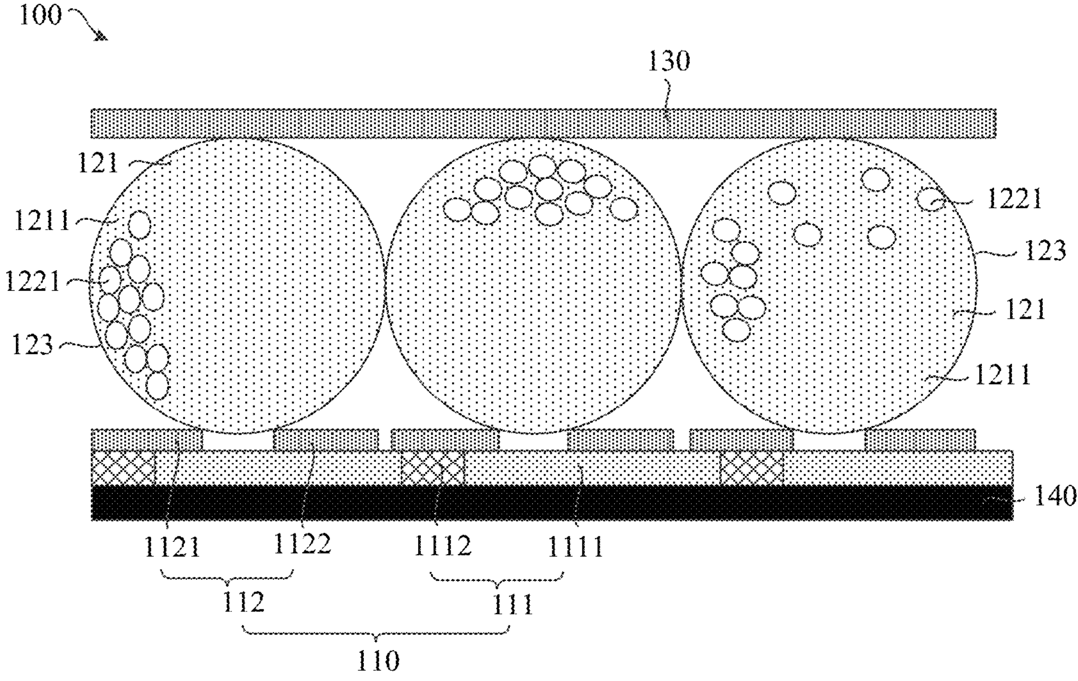
FIG. 8 is a schematic diagram of a structure of an electronic ink screen according to an embodiment of this application.

Certainly; in other embodiments, as shown in FIG. 8, the black matrix layer 140 may alternatively be located at a side that is of the first conductive substrate 110 and that faces away from the second conductive substrate 130. This is not limited in this embodiment of this application.

Figure 9:
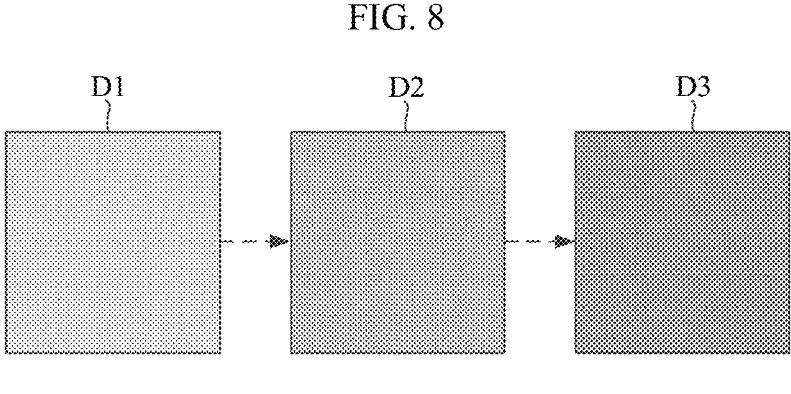
FIG. 9 is a schematic diagram of display states of different gray scales of an electronic ink screen according to an embodiment of this application.

In addition, it should be noted that, in this embodiment of this application, when displaying in the gray state, the electronic ink screen 100 may present various different forms of gray scale. Specifically, a magnitude of intensity of the electric field may be adjusted based on quantitative control on an applied voltage, to enable the electronic ink screen 100 to display different shades of gray states. For example, FIG. 9 shows three different forms of gray scale (that is, a first gray state D1, a second gray state D2, and a third gray state D3). As shown in FIG. 9, from left to right, a color of the gray state displayed by the electronic ink screen 100 becomes increasingly dark.

Embodiment 2

An embodiment of this application further provides an electronic ink screen 100 with another structure. Compared with Embodiment 2, a difference between Embodiment 2 and Embodiment 2 lies in that specific materials of function layers are different.

Figures 10, 11A:
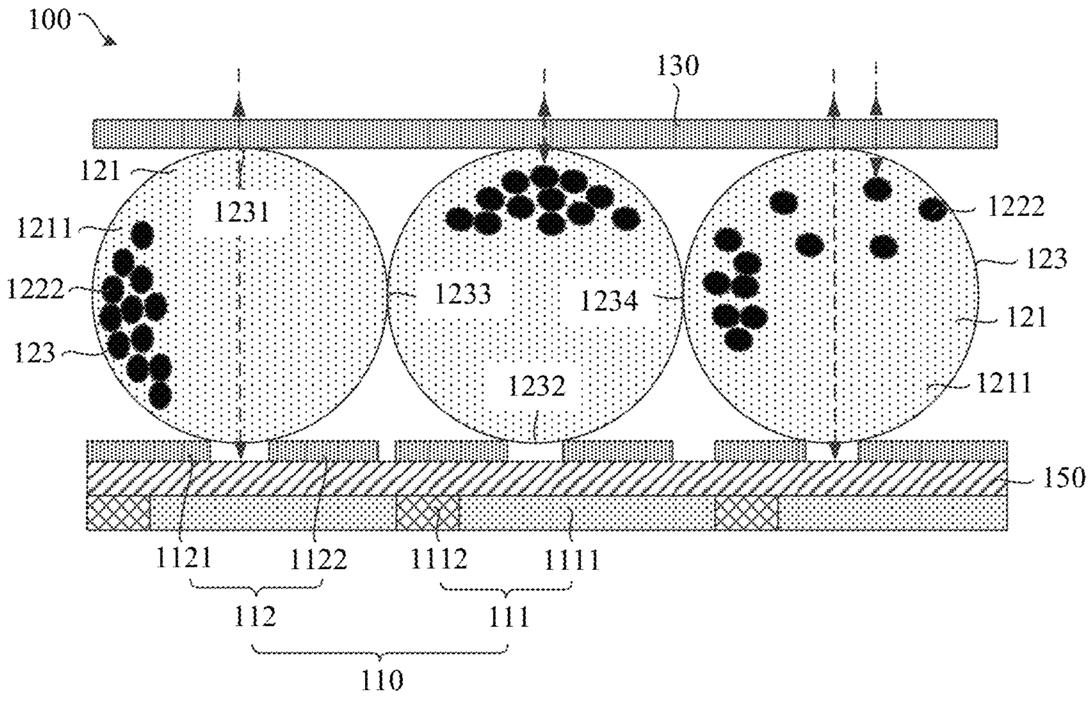
FIG. 10 is a schematic diagram of a structure of an electronic ink screen according to an embodiment of this application.
FIG. 11A is a schematic diagram of a structure when white ink particles in the electronic ink screen shown in FIG. 10 move to an inner side wall close to an ink accommodating cavity.

As shown in FIG. 10, in this embodiment of this application, a function layer may be a reflective metal layer 150, and ink particles may be black ink particles 1222.

In this way, when an electric field in a parallel direction is applied, a plurality of black ink particles 1222 in each ink accommodating cavity 121 move to an inner side wall close to the ink accommodating cavity 121. For example, in FIG. 11A, the plurality of black ink particles 1222 in the ink accommodating cavity 121 move to an inner left side wall 1233 close to the ink accommodating cavity 121. In this case, sunlight passes through a microcapsule structure 123, shines downward, and is absorbed by the reflective metal layer 150. A color displayed by the electronic ink screen 100 is a white color, that is, the electronic ink screen 100 in is a white state.

Figure 11B:
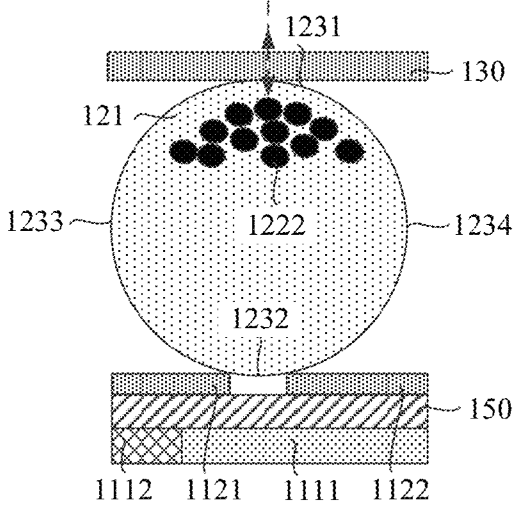
FIG. 11B is a schematic diagram of a structure when white ink particles in the electronic ink screen shown in FIG. 10 move to an inner top wall close to an ink accommodating cavity.

When an electric field in a vertical direction is applied, the plurality of black ink particles 1222 in each ink accommodating cavity 121 move to an inner top wall 1231 or an inner bottom wall 1232 close to the ink accommodating cavity 121. For example, in FIG. 11B, the plurality of black ink particles 1222 in the ink accommodating cavity 121 move to the inner top wall 1231 close to the ink accommodating cavity 121. In this case, the sunlight passes through the microcapsule structure 123, and shines downward, and is absorbed by the black ink particles 1222. A color displayed by the electronic ink screen 100 is a color presented by the black ink particles 1222. That is, the electronic ink screen 100 in is a black state.

Figure 11C:
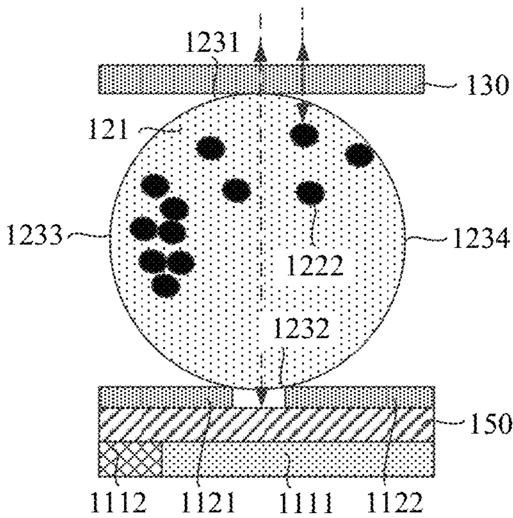
FIG. 11C is a schematic diagram of a structure when white ink particles in the electronic ink screen shown in FIG. 10 are dispersedly provided in an ink accommodating cavity.

When both the electric field in the parallel direction and the electric field in the vertical direction are applied, the plurality of black ink particles 1222 in each ink accommodating cavity 121 are dispersedly provided in the ink accommodating cavity 121 (refer to FIG. 11C). In this case, the electronic ink screen 100 displays in a gray state.

In other words, in this embodiment of this application, it only needs to provide the plurality of black ink particles 1222 in each ink accommodating cavity 121, and apply the electric fields in different directions, to enable the electronic ink screen 100 to present states of different colors. This avoids a problem of motion interference generated by switches between ink particles of two different colors in the prior art, so that a refreshing speed of the electronic ink screen 100 can be improved, thereby reducing a response time of the electronic ink screen 100.

Figure 12:
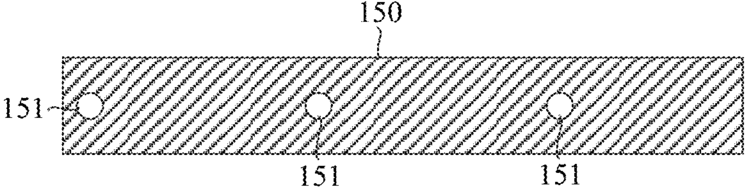
FIG. 12 is a top view of a black matrix layer of an electronic ink screen according to an embodiment of this application.

In this embodiment of this application, the reflective metal layer 150 may be located between an electrode layer and a drive layer 111 (refer to FIG. 10). An electrode group 112 is connected to the drive layer 111 by an electrode lead (not shown), and the drive layer 111 provides a voltage for the electrode group 112 through the electrode lead. In this case, generally, second through holes 151 are needed to be provided on the reflective metal layer 150 (refer to FIG. 12), so that the electrode lead passes through the second through holes 151 on the reflective metal layer 150 to implement providing, by the drive layer 111, a voltage for the electrode group 112.

Figure 13:
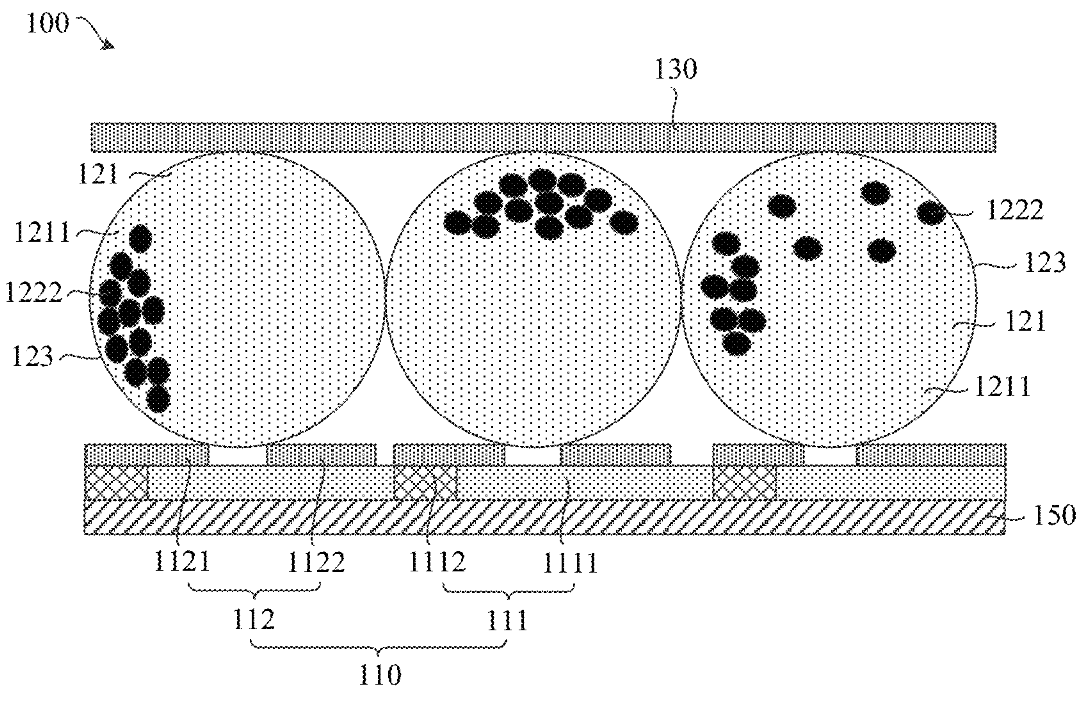
FIG. 13 is a schematic diagram of a structure of an electronic ink screen according to an embodiment of this application.

Certainly, in other embodiments, as shown in FIG. 13, the reflective metal layer 150 may be located at a side that is of the first conductive substrate 110 and that faces away from a second conductive substrate 130. This is not limited in this embodiment of this application.

It should be noted that a material used by the reflective metal layer 150 may be aluminum or silver.

It may be understood that, in this embodiment of this application, in a first drive state, that is, the drive layer 111 provides a voltage for the electrode group 112 (at least one of a first electrode 1121 and a second electrode 1122), an electric field in a horizontal direction may be formed between the first electrode 1121 and the second electrode 1122. In this case, the black ink particles 1222 move to the inner side wall close to the ink accommodating cavity 121, and the electronic ink screen 100 displays a white color. In a second drive state, that is, the drive layer 111 provides a voltage for the electrode group 112 (at least one of the first electrode 1121 and the second electrode 1122), the electric field in the vertical direction is formed between the electrode group 112 and a second conductive substrate 130. In this case, the black ink particles 1222 move to the inner top wall 1231 or the inner bottom wall 1232 close to the ink accommodating cavity 121, and the electronic ink screen 100 displays a black color. In a third drive state, that is, the drive layer 111 provides a voltage for the electrode group 112 (at least one of the first electrode 1121 and the second electrode 1122), the electric field in the horizontal direction is formed between the first electrode 1121 and the second electrode 1122, the electric field in the vertical direction is formed between the electrode group 112 and the second conductive substrate 130, the black ink particles 1222 are dispersedly provided in the ink accommodating cavity 121, and the electronic ink screen displays 100 in a gray state.

Other technical features are the same as those in Embodiment 1, and a same technical effect can be achieved. Details are not described herein again.

Embodiment 3

An embodiment of this application further provides an electronic ink screen 100 with another structure. Compared with Embodiment 1 and Embodiment 2, a difference between Embodiment 3 and Embodiment 1 and Embodiment 2 lies in that specific materials of function layers are different.

Figure 14:
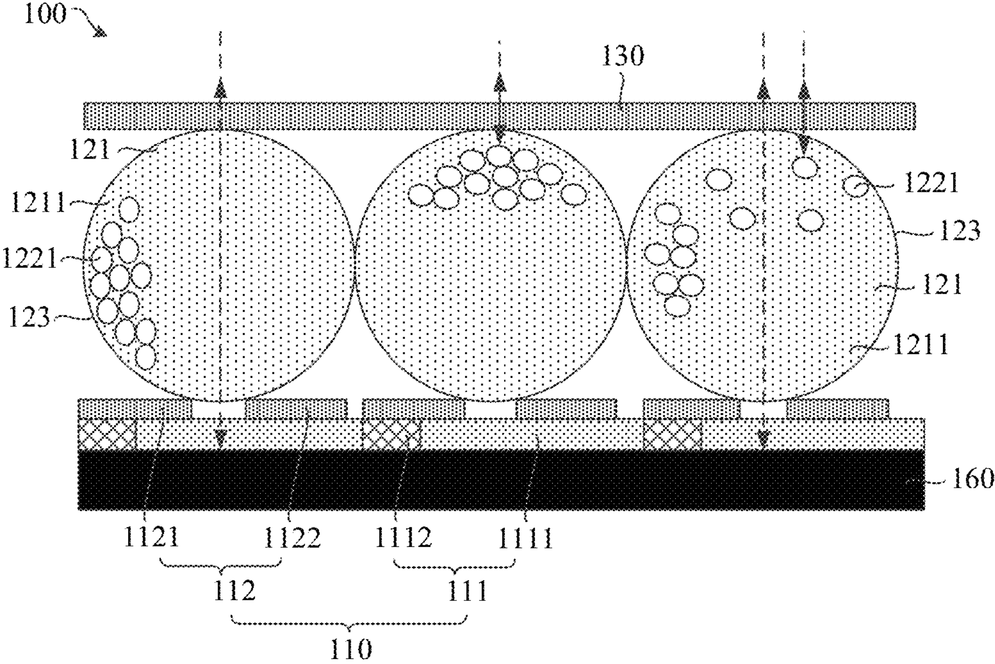
FIG. 14 is a schematic diagram of a structure of an electronic ink screen according to an embodiment of this application.

Refer to FIG. 14. In an embodiment of this application, a function layer may be a display screen 160. Specifically, the display screen 160 may be an organic light-emitting diode display screen 160 (Organic Light-Emitting Diode, OLED), or a liquid crystal display 160 (Liquid Crystal Display, LCD).

It should be noted that as shown in FIG. 14, in this embodiment of this application, ink particles may be white ink particles 1221, and the display screen 160 may be in a black state.

Figure 15A:
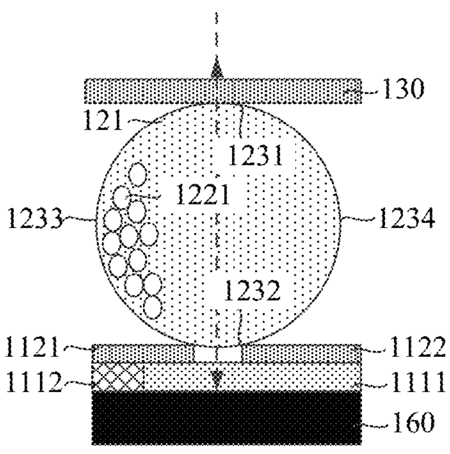
FIG. 15A is a schematic diagram of a structure when white ink particles in the electronic ink screen shown in FIG. 14 move to an inner side wall close to an ink accommodating cavity.

In this way, when an electric field in a parallel direction is applied, a plurality of white ink particles 1221 in each ink accommodating cavity 121 move to an inner side wall close to the ink accommodating cavity 121. For example, in FIG. 15A, the plurality of white ink particles 1221 in the ink accommodating cavity 121 move to an inner left side wall 1233 close to the ink accommodating cavity 121. In this case, a color displayed by the electronic ink screen 100 is a color displayed by the organic light-emitting diode display screen 160 or the liquid crystal display 160. That is, the electronic ink screen 100 is in a black state.

Figure 15B:
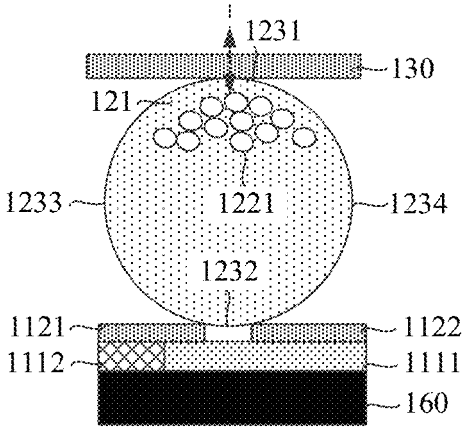
FIG. 15B is a schematic diagram of a structure when white ink particles in the electronic ink screen shown in FIG. 14 move to an inner top wall close to an ink accommodating cavity.

When the electric field in the vertical direction is applied, the plurality of white ink particles 1221 in each ink accommodating cavity 121 move to an inner top wall 1231 or an inner bottom wall 1232 close to the ink accommodating cavity 121. For example, in FIG. 15B, the plurality of white ink particles 1221 in each ink accommodating cavity 121 move to the inner top wall 1231 close to the ink accommodating cavity 121. In this case, a color displayed by the electronic ink screen 100 is a color presented by the white ink particles 1221. That is, the electronic ink screen 100 in is a white state.

Figure 15C:
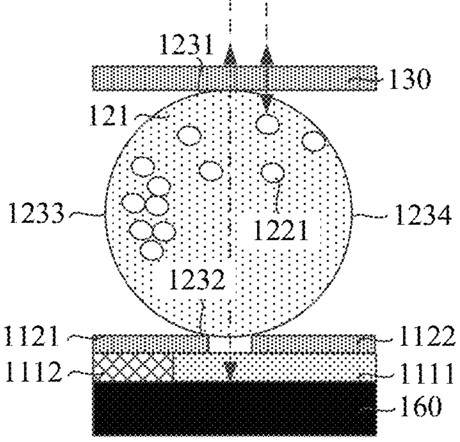
FIG. 15C is a schematic diagram of a structure when white ink particles in the electronic ink screen shown in FIG. 14 are dispersedly provided in an ink accommodating cavity.

When both the electric field in the parallel direction and the electric field in the vertical direction are applied, the plurality of white ink particles 1221 in each ink accommodating cavity 121 are dispersedly provided in the ink accommodating cavity 121 (refer to FIG. 15C). In this case, the electronic ink screen 100 displays in a gray state.

In other words, it only needs to provide the plurality of white ink particles 1221 in each ink accommodating cavity 121, and apply the electric fields in different directions, to enable the electronic ink screen 100 to present states of different colors. This avoids a problem of motion interference generated by switches between ink particles of two different colors in the prior art, so that a refreshing speed of the electronic ink screen 100 can be improved, thereby reducing a response time of the electronic ink screen 100.

It should be noted that in some embodiments, as shown FIG. 14, the display screen 160 may be located at a side that is of the first conductive substrate 110 and that faces away from an ink display layer.

Specifically, in this embodiment of this application, in a first drive state, that is, a drive layer 111 provides a voltage for an electrode group 112 (at least one of a first electrode 1121 and a second electrode 1122), an electric field in a horizontal direction is formed between the first electrode 1121 and a second electrode 1122, the white ink particles 1221 move to the inner side wall close to the ink accommodating cavity 121, and the electronic ink screen 100 displays a black color. In a second drive state, that is, the drive layer 111 provides a voltage for the electrode group 112 (at least one of the first electrode 1121 and the second electrode 1122), the electric field in the vertical direction is formed between the electrode group 112 and a second conductive substrate 130, the white ink particles 1221 move to the inner top wall 1231 or the inner bottom wall 1232 close to the ink accommodating cavity 121, and the electronic ink screen 100 displays a white color. In a third drive state, that is, the drive layer 111 provides a voltage for the electrode group 112 (at least one of the first electrode 1121 and the second electrode 1122), the electric field in the horizontal direction is formed between the first electrode 1121 and the second electrode 1122, the electric field in the vertical direction is formed between the electrode group 112 and the second conductive substrate 130, the white ink particles 1221 are dispersedly provided in the ink accommodating cavity 121, and the electronic ink screen 100 displays in a gray state.

Other technical features are the same as those in Embodiment 1 and Embodiment 2, and a same technical effect can be achieved. Details are not described herein again.

Embodiment 4

An embodiment of this application further provides an electronic ink screen 100 with another structure. Compared with Embodiment 3, a difference between Embodiment 4 and Embodiment 3 lies in that when a function layer is a display screen 160, a display state of the display screen 160 is not the same.

Figures 16, 17A:
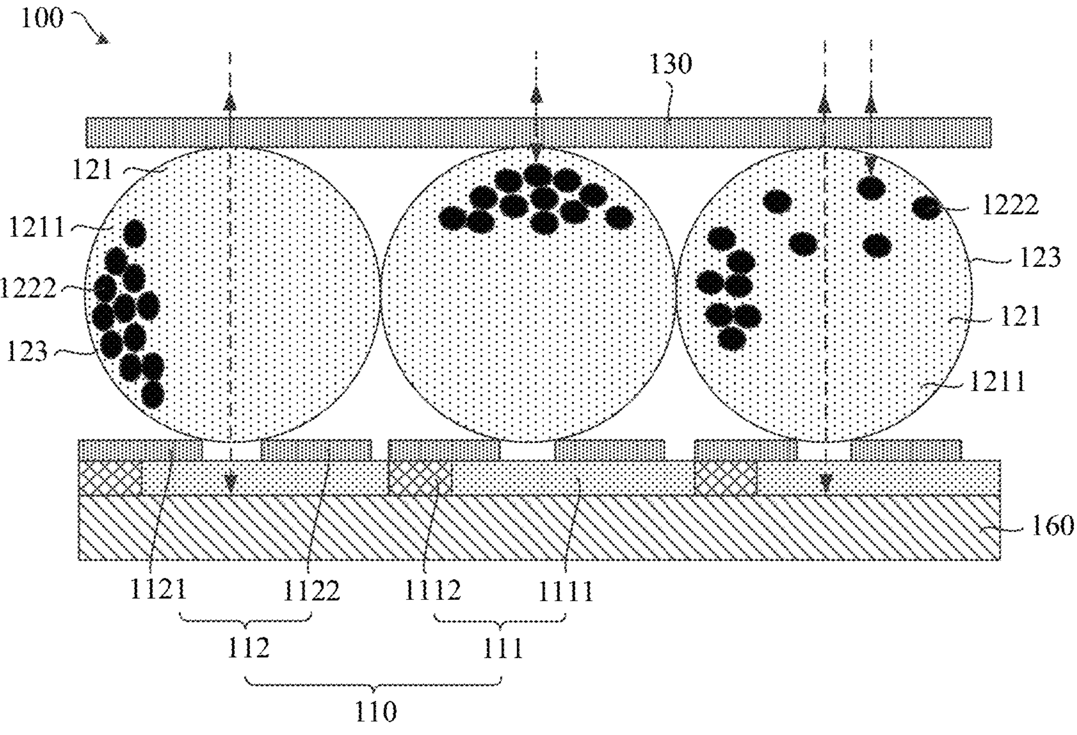
FIG. 16 is a schematic diagram of a structure of an electronic ink screen according to an embodiment of this application.
FIG. 17A is a schematic diagram of a structure when white ink particles in the electronic ink screen shown in FIG. 16 move to an inner side wall close to an ink accommodating cavity.

Refer to FIG. 16. In this embodiment of this application, ink particles may be black ink particles 1222, and the display screen 160 may be in a display state.

In this way, when an electric field in a parallel direction is applied, a plurality of black ink particles 1222 in each ink accommodating cavity 121 move to an inner side wall close to the ink accommodating cavity 121. For example, in FIG. 17A, the plurality of black ink particles 1222 in the ink accommodating cavity 121 move to an inner left side wall 1233 close to the ink accommodating cavity 121. In this case, a color displayed by the electronic ink screen 100 is a color displayed by an organic light-emitting diode display screen 160 or a liquid crystal display 160. That is, the electronic ink screen 100 is in the display state (for example, a white state).

When an electric field in a vertical direction is applied, the plurality of black ink particles 1222 in each ink accommodating cavity 121 move to an inner top wall 1231 or an inner bottom wall 1232 close to the ink accommodating cavity 121. For example, in FIG. 17B, the plurality of black ink particles 1222 in the ink accommodating cavity 121 move to the inner top wall 1231 close to the ink accommodating cavity 121. In this case, a color displayed by the electronic ink screen 100 is a color presented by the black ink particles 1222. That is, the electronic ink screen 100 in is a black state.

Figures 17B, 17C:
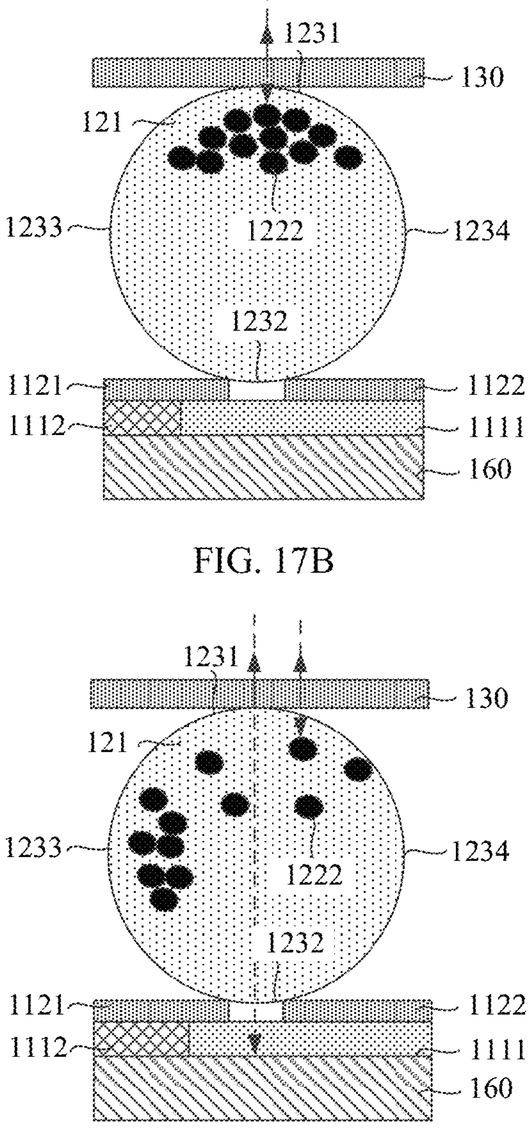
FIG. 17B is a schematic diagram of a structure when white ink particles in the electronic ink screen shown in FIG. 16 move to an inner top wall close to an ink accommodating cavity.
FIG. 17C is a schematic diagram of a structure when white ink particles in the electronic ink screen shown in FIG. 16 are dispersedly provided in an ink accommodating cavity.

When both the electric field in the parallel direction and the electric field in the vertical direction are applied, the plurality of black ink particles 1222 in each ink accommodating cavity 121 are dispersedly provided in the ink accommodating cavity 121 (refer to FIG. 17C). In this case, the electronic ink screen 100 displays in a gray state.

In other words, it only needs to provide the plurality of black ink particles 1222 in each ink accommodating cavity 121, and apply the electric fields in different directions, to enable the electronic ink screen 100 to present states of different colors. This avoids a problem of motion interference generated by switches between ink particles of two different colors in the prior art, so that a refreshing speed of the electronic ink screen 100 can be improved, thereby reducing a response time of the electronic ink screen 100.

Specifically, in this embodiment of this application, in a first drive state, that is, a drive layer 111 provides a voltage for an electrode group 112 (at least one of a first electrode 1121 and a second electrode 1122), an electric field in a horizontal direction is formed between the first electrode 1121 and the second electrode 1122, the black ink particles

1222 move to the inner side wall close to the ink accommodating cavity 121, and the electronic ink screen 100 displays a white color. In a second drive state, that is, the drive layer 111 provides a voltage for the electrode group 112 (at least one of the first electrode 1121 and the second electrode 1122), the electric field in the vertical direction is formed between the electrode group 112 and a second conductive substrate 130, the black ink particles 1222 move to the inner top wall 1231 or the inner bottom wall 1232 close to the ink accommodating cavity 121, and the electronic ink screen 100 displays a black color. In a third drive state, that is, the drive layer 111 provides a voltage for the electrode group 112 (at least one of the first electrode 1121 and the second electrode 1122), the electric field in the horizontal direction is formed between the first electrode 1121 and the second electrode 1122, the electric field in the vertical direction is formed between the electrode group 112 and the second conductive substrate 130, the black ink particles 1222 are dispersedly provided in the ink accommodating cavity 121, and the electronic ink screen displays 100 in a gray state.

In addition, in conventional technologies, the electronic ink screen 100 can only support simple colors and gray scales. For example, the electronic ink screen 100 can only display two colors of black and white, but cannot display rich colors, resulting poor user experience. However, in this embodiment of this application, when the display screen 160 is in a display state, a display color of the display screen 160 may be designed to different colors, such as light yellow, light blue and light green, to enlarge a display color gamut of the ink display screen 160. In addition, display states of an ink display layer and the display screen 160 (for example, an OLED or an LCD) are flexibly switched, which facilitates the ink display screen 160 to achieve a display effect of a full color gamut.

In addition, because a plurality of ink particles with a same color are only provided in each ink accommodating cavity 121, when the electronic ink screen 100 displays in a transparent state, overall transmittance of the electronic ink screen 100 can be improved significantly. In particular, an impact of a microcapsule structure 123 on normal display of the display screen 160 (for example, the OLED or the LCD) can be reduced.

Other technical features are the same as those in Embodiment 1, Embodiment 2, and Embodiment 3, and a same technical effect can be achieved. Details are not described herein again.

Embodiment 5

Based on the foregoing Embodiment 1, Embodiment 2, Embodiment 3, and Embodiment 4, an embodiment of this application provides a display apparatus. The display apparatus may includes at least the electronic ink screen 100 in any one of the foregoing embodiments.

It should be noted that the display apparatus may be various products or components that have a display function, such as an electronic label, an electronic book, a wearable device (for example, a watch), an electronic reader, a navigator, an electronic photo frame, a home appliance (for example, an alarm clock in a double-sided display or a transparent display manner), and a billboard of a supermarket. A specific application scenario of an ink display screen 160 is not limited in this embodiment of this application.

The display apparatus according to this embodiment of this application. The display apparatus may include the ink display screen 160. In the electronic ink screen 100, a function layer is disposed at a side that is of an ink display layer and that faces away from a second conductive substrate 130. When an electric field in a parallel direction is applied, a plurality of ink particles of each ink accommodating cavity 121 move to an inner side wall close to the ink accommodating cavity 121. In this case, a color displayed by the electronic ink screen 100 is a color generated by the function layer. When an electric field in a vertical direction is applied, the plurality of ink particles in each ink accommodating cavity 121 move to an inner top wall 1231 or an inner bottom wall 1232 close to the ink accommodating cavity 121. In this case, a color displayed by the electronic ink screen 100 is a color presented by the ink particles in the ink accommodating cavity 121. When both the electric field in the parallel direction and the electric field in the vertical direction are applied, the plurality of ink particles in each ink accommodating cavity 121 are dispersedly provided in the ink accommodating cavity 121. In this case, the electronic ink screen 100 displays in a gray state. Therefore, in this embodiment of this application, it only needs to provide the plurality of ink particles with a same color in each ink accommodating cavity 121, and apply the electric fields in different directions, to enable the electronic ink screen 100 to present states of different colors. This avoids a problem of motion interference generated by switches between ink particles of two different colors in the prior art, so that a refreshing speed of the electronic ink screen 100 can be improved, thereby reducing a response time of the electronic ink screen 100.

In addition, the display apparatus also has an advantage of low power consumption compared with a liquid crystal display apparatus, an OLED display apparatus, and the like in the prior art.

Other technical features are the same as those in Embodiment 1, Embodiment 2, Embodiment 3, and Embodiment 4, and a same technical effect can be achieved. Details are not described herein again.

In descriptions of embodiments of this application, it should be noted that unless otherwise specified or limited, the terms “mount”, “connect”, and “connection” should be understood broadly. For example, the connection may be a fixed connection, an indirect connection through an intermediary; or internal communication between two components or mutual interaction relationship between two components. A person of ordinary skill in the art may understand specific meanings of the foregoing terms in embodiments of this application based on specific situations.

The apparatus or element indicated or implied in embodiments of this application needs to have a particular orientation and be constructed and operated in the particular orientation, and therefore cannot be understood as a limitation on embodiments of this application. In descriptions of embodiments of this application, unless otherwise specifically limited, “a plurality of” means two or more.

The terms such as “first”, “second”, “third”, and “fourth” (if any) in the specification, claims and accompany drawings of embodiments of this application are used for distinguishing between similar objects but do not necessarily describe a particular order or sequence. It should be understood that data used in this way is exchangeable in a proper case, so that embodiments of embodiments of this application described herein can be implemented, for example, in an order different from the order shown or described herein. Moreover, the terms “may include”, “have” and any other variants are intended to cover non-exclusive inclusion, for example, a process, method, system, product, or device that includes a list of steps or units is not necessarily limited to those expressly listed steps or units, but may include other steps or units not expressly listed or inherent to such a process, method, system, product, or device.

Finally, it should be noted that the foregoing embodiments are merely intended for describing the technical solutions of embodiments of this application other than limiting this application. Although embodiments of this application are described in detail with reference to the foregoing embodiments, a person of ordinary skill in the art should understand that modifications may be made to the technical solutions described in the foregoing embodiments, or equivalent replacements may be made to some or all technical features in the technical solutions, and such modifications or replacements do not cause the essence of corresponding technical solutions to depart from the scope of the technical solutions of embodiments of this application.

What is claimed is:

1. An electronic ink screen:

a first conductive substrate comprising a drive layer and an electrode layer;

a second conductive substrate located above the first conductive substrate;

an ink display layer located between the first conductive substrate and the second conductive substrate, wherein the ink display layer has a plurality of ink accommodating cavities that are mutually independent, wherein each of the ink accommodating cavities is respectively provided with ink particles that have a same color such that each ink accommodating cavity includes only one color of ink particles, and wherein the ink particles are configured to display a first color; and a function layer located at a side of the ink display layer, wherein the side of the ink display layer faces away from the second conductive substrate, and wherein the function layer is configured to display a second color, wherein the electrode layer comprises at least one electrode group, and each ink accommodating cavity corresponds to one electrode group, wherein the electrode group comprises a first electrode and a second electrode disposed relative to each other in a thickness direction perpendicular to the electronic ink screen, wherein the drive layer is configured to provide a voltage to the electrode layer, to form an electric field in a vertical direction between the electrode layer and the second conductive substrate, and to form an electric field in a horizontal direction between the first electrode and the second electrode, wherein the electric field in the vertical direction is configured to control the ink particles to move in the vertical direction in the ink accommodating cavity, and the electric field in the horizontal direction is configured to control the ink particles to move in the horizontal direction in the ink accommodating cavity, wherein in a first drive state, the electric field in the horizontal direction is formed between the first electrode and the second electrode, the ink particles move to an inner side wall of the ink accommodating cavity, and the electronic ink screen displays the second color, wherein in a second drive state, the electric field in the vertical direction is formed between the electrode layer and the second conductive substrate, the ink particles move to an inner top wall or an inner bottom wall of the ink accommodating cavity, and the electronic ink screen displays the first color, and wherein in a third drive state, the electric field in the horizontal direction is formed between the first electrode and the second electrode, the electric field in the vertical direction is formed between the electrode layer and the second conductive substrate, the ink particles are dispersedly provided in the ink accommodating cavity, and the electronic ink screen displays in a gray state.

2. The electronic ink screen of claim 1, wherein the drive layer comprises a substrate layer and at least one drive switch that is located on the substrate layer, and wherein the at least one drive switch is configured to provide a voltage to the electrode layer.

3. The electronic ink screen of claim 2, wherein each ink accommodating cavity corresponds to a drive switch, and wherein the drive switch is configured to provide a voltage to the first electrode or to the second electrode.

4. The electronic ink screen of claim 2, wherein each ink accommodating cavity corresponds to two drive switches, and wherein one of the two drive switches is configured to provide a voltage to the first electrode, and the other of the two drive switches is configured to provide a voltage to the second electrode.

5. The electronic ink screen of claim 1, wherein the function layer is a black matrix layer, and the ink particles are white ink particles.

6. The electronic ink screen of claim 5, wherein in the first drive state, the white ink particles move to the inner side wall of the ink accommodating cavity, and the electronic ink screen displays a black color, wherein in the second drive state, the white ink particles move to the inner top wall or the inner bottom wall of the ink accommodating cavity, and the electronic ink screen displays a white color, and wherein in the third drive state, the white ink particles are dispersedly provided in the ink accommodating cavity.

7. The electronic ink screen of claim 5, wherein the black matrix layer is located between the ink display layer and the first conductive substrate.

8. The electronic ink screen of claim 5, wherein the black matrix layer is located between the electrode layer and the drive layer.

9. The electronic ink screen of claim 1, wherein the function layer is a reflective metal layer, and the ink particles are black ink particles.

10. The electronic ink screen of claim 9, wherein in the first drive state, the black ink particles move to the inner side wall of the ink accommodating cavity, and the electronic ink screen displays a white color, wherein in the second drive state, the black ink particles move to the inner top wall or the inner bottom wall of the ink accommodating cavity, and the electronic ink screen displays a black color, and wherein in the third drive state, the black ink particles are dispersedly provided in the ink accommodating cavity.

11. The electronic ink screen of claim 9, wherein the reflective metal layer is located between the electrode layer and the drive layer.

12. The electronic ink screen of claim 1, wherein the function layer is a display screen.

13. The electronic ink screen of claim 12, wherein the ink particles are white ink particles, and the display screen is in a black state.

14. The electronic ink screen of claim 13, wherein in the first drive state the white ink particles move to the inner side wall of the ink accommodating cavity, and the electronic ink screen displays a black color, wherein in the second drive state the white ink particles move to the inner top wall or the inner bottom wall of the ink accommodating cavity, and the electronic ink screen displays a white color, and wherein in the third drive state the white ink particles are dispersedly provided in the ink accommodating cavity.

15. The electronic ink screen of claim 12, wherein the ink particles are black ink particles, and the display screen is in a display state.

16. The electronic ink screen of claim 15, wherein in the first drive state, the black ink particles move to the inner side wall of the ink accommodating cavity, and the electronic ink screen displays a white color, wherein in the second drive state, the black ink particles move to the inner top wall or the inner bottom wall of the ink accommodating cavity, and the electronic ink screen displays a black color, and wherein in the third drive state, the black ink particles are dispersedly provided in the ink accommodating cavity.

17. The electronic ink screen of claim 12, wherein the display screen is located at a side of the first conductive substrate, and the side of the first conductive substrate faces away from the ink display layer.

18. The electronic ink screen of claim 1, wherein the ink display layer comprises a plurality of microcapsule structures, and internal space of each microcapsule structure forms the ink accommodating cavity.

19. The electronic ink screen of claim 1, wherein the ink display layer comprises a plurality of microcup structures, and internal space of each microcup structure forms the ink accommodating cavity.

20. A display apparatus, comprising:

an electronic ink screen, comprising:

a first conductive substrate comprising a drive layer and an electrode layer;

a second conductive substrate located above the first conductive substrate;

an ink display layer located between the first conductive substrate and the second conductive substrate, wherein the ink display layer has a plurality of ink accommodating cavities that are mutually independent, wherein each of the ink accommodating cavities is respectively provided with ink particles that have a same color such that each ink accommodating cavity includes only one color of ink particles, and wherein the ink particles are configured to display a first color; and a function layer located at a side of the ink display layer, wherein the side of the ink display layer faces away from the second conductive substrate, and wherein the function layer is configured to display a second color, wherein the electrode layer comprises at least one electrode group, and each ink accommodating cavity corresponds to one electrode group, wherein the electrode group comprises a first electrode and a second electrode disposed relative to each other in a thickness direction perpendicular to the electronic ink screen, wherein the drive layer is configured to provide a voltage to the electrode layer, to form an electric field in a vertical direction between the electrode layer and the second conductive substrate, and to form an electric field in a horizontal direction between the first electrode and the second electrode, wherein the electric field in the vertical direction is configured to control the ink particles to move in the vertical direction in the ink accommodating cavity, and the electric field in the horizontal direction is configured to control the ink particles to move in the horizontal direction in the ink accommodating cavity;

wherein in a first drive state, the electric field in the horizontal direction is formed between the first electrode and the second electrode, the ink particles move to an inner side wall of the ink accommodating cavity, and the electronic ink screen displays the second color, wherein in a second drive state, the electric field in the vertical direction is formed between the electrode layer and the second conductive substrate, the ink particles move to an inner top wall or an inner bottom wall of the ink accommodating cavity, and the electronic ink screen displays the first color, and wherein in a third drive state, the electric field in the horizontal direction is formed between the first electrode and the second electrode, the electric field in the vertical direction is formed between the electrode layer and the second conductive substrate, the ink particles are dispersedly provided in the ink accommodating cavity, and the electronic ink screen displays in a gray state.

* * * * *